(12) United States Patent
Furia

(10) Patent No.: US 9,636,831 B1
(45) Date of Patent: May 2, 2017

(54) METHOD AND APPARATUS FOR CUTTING ITEMS

(71) Applicant: Vincenzo A. Furia, Clifton, NJ (US)

(72) Inventor: Vincenzo A. Furia, Clifton, NJ (US)

(*) Notice: Subject to any disclaimer, the term of this patent is extended or adjusted under 35 U.S.C. 154(b) by 0 days.

(21) Appl. No.: 15/270,084

(22) Filed: Sep. 20, 2016

(51) Int. Cl.
*B26D 3/16* (2006.01)
*B26B 29/06* (2006.01)
*A47J 47/00* (2006.01)
*B26D 7/20* (2006.01)

(52) U.S. Cl.
CPC .......... *B26B 29/063* (2013.01); *A47J 47/005* (2013.01); *B26D 3/16* (2013.01); *B26B 2029/066* (2013.01); *B26D 7/20* (2013.01); *Y10T 83/695* (2015.04); *Y10T 83/75* (2015.04)

(58) Field of Classification Search
CPC . B26D 3/16; B26D 7/20; B26B 29/063; A47J 47/005; Y10T 83/75; Y10T 83/695
USPC ............. 30/124, 114, 289–290; 83/767, 451, 83/468.7, 932, 467.1, 468.5, 468.6, 83/761–765, 870; 220/23.6, 4.28
See application file for complete search history.

(56) References Cited

U.S. PATENT DOCUMENTS

| 920,345 | A | | 5/1909 | Kolodziej | |
|---|---|---|---|---|---|
| 1,005,128 | A | | 10/1911 | Blain | |
| 1,072,450 | A | | 9/1913 | Hamblin | |
| 1,605,770 | A | | 5/1925 | Potter | |
| 2,398,192 | A | * | 4/1946 | Scheminger, Jr. .... | B26B 29/063 83/762 |
| 2,609,564 | A | | 9/1952 | Grimm | |
| 2,679,274 | A | | 5/1954 | Criner | |
| 3,058,503 | A | | 10/1962 | Perakis | |
| 3,075,565 | A | | 1/1963 | Weaver et al. | |
| 3,318,352 | A | | 5/1967 | Seltzer | |
| 3,452,795 | A | | 7/1969 | Davies | |
| 4,056,026 | A | * | 11/1977 | Panaritis .............. | A22C 17/006 269/295 |
| 4,125,046 | A | | 11/1978 | Kroh et al. | |
| 4,133,238 | A | | 1/1979 | Jacobs | |
| 4,890,525 | A | | 1/1990 | Bilbao | |
| 4,955,271 | A | | 9/1990 | Boutin-Lester | |
| 4,964,323 | A | * | 10/1990 | Fortney ................. | B26B 29/063 83/167 |
| 4,974,291 | A | | 12/1990 | McNerney | |
| 5,115,704 | A | * | 5/1992 | Hyman ................. | B26B 29/063 83/467.1 |
| 5,386,755 | A | * | 2/1995 | Schneider ............. | B26B 29/063 30/289 |

(Continued)

*Primary Examiner* — Ghassem Alie
*Assistant Examiner* — Nhat Chieu Do
(74) *Attorney, Agent, or Firm* — Walter J. Tencza, Jr.

(57) ABSTRACT

An apparatus for cutting an item, such as a roast, a bagel, or a loaf of bread, comprising first and second wall devices, a cutting board device, and a base. The first and second wall devices may each have a plurality of vertical slots which are parallel and spaced apart from each other. The first and second wall devices may be configured to be attached to the base in a manner such that the first wall device projects out from the base, at an angle. The cutting board device may include a cutting board body and pins for removably supporting the cutting board device by both the first and second wall devices so that first and second parts of the cutting board device rest on the first and second wall devices to thereby support and suspend the cutting board body above and substantially parallel to the base.

16 Claims, 22 Drawing Sheets

(56) References Cited

U.S. PATENT DOCUMENTS

| | | |
|---|---|---|
| D362,374 S * | 9/1995 | Roach .......................... D7/673 |
| 5,499,578 A | 3/1996 | Payne |
| 5,680,803 A | 10/1997 | Vizurraga et al. |
| 5,697,276 A * | 12/1997 | Nassau ................. B26B 29/063 |
| | | 269/291 |
| 6,202,529 B1 | 3/2001 | Hodsdon |
| 7,617,753 B2 | 11/2009 | Bouton et al. |
| 8,241,688 B2 | 8/2012 | Aguirre |
| 8,448,552 B2 | 5/2013 | Hoffman |
| 8,808,070 B2 | 8/2014 | Wong |
| 9,266,247 B1 * | 2/2016 | Coulon ................. B26B 29/063 |
| 2004/0016131 A1 | 1/2004 | Hayashi |
| 2004/0144227 A1 | 7/2004 | White |
| 2008/0135190 A1 | 6/2008 | Cheng |
| 2011/0232441 A1 * | 9/2011 | Aguirre ................. A47J 47/005 |
| | | 83/35 |
| 2013/0025421 A1 | 1/2013 | Trimarchi et al. |
| 2014/0054836 A1 | 2/2014 | Chen |
| 2015/0217470 A1 | 8/2015 | Lowetz |

* cited by examiner

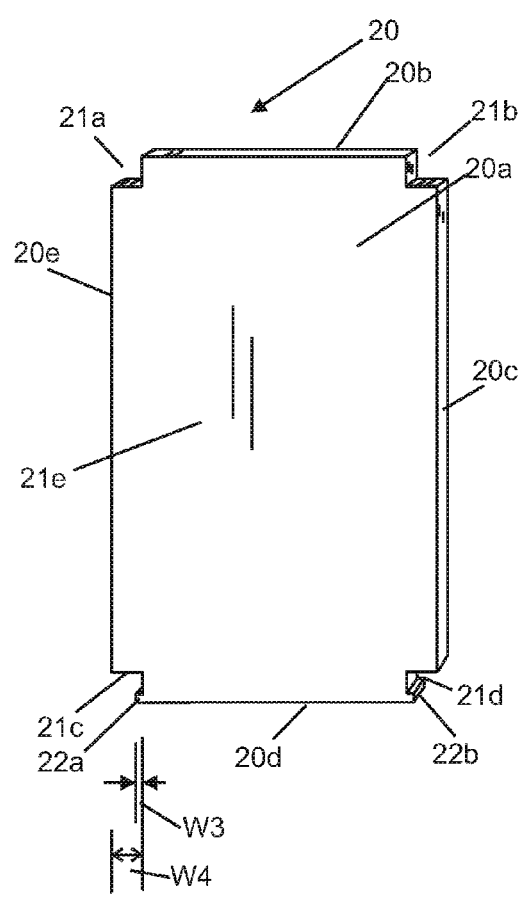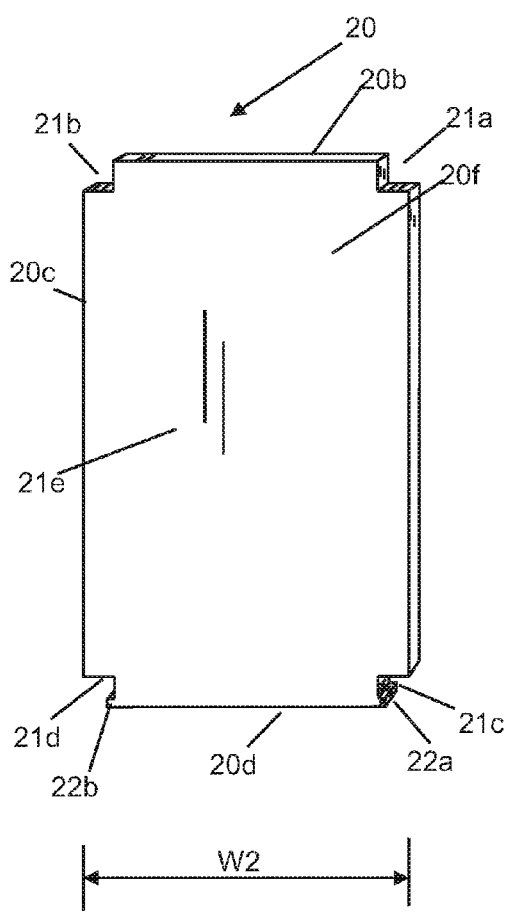

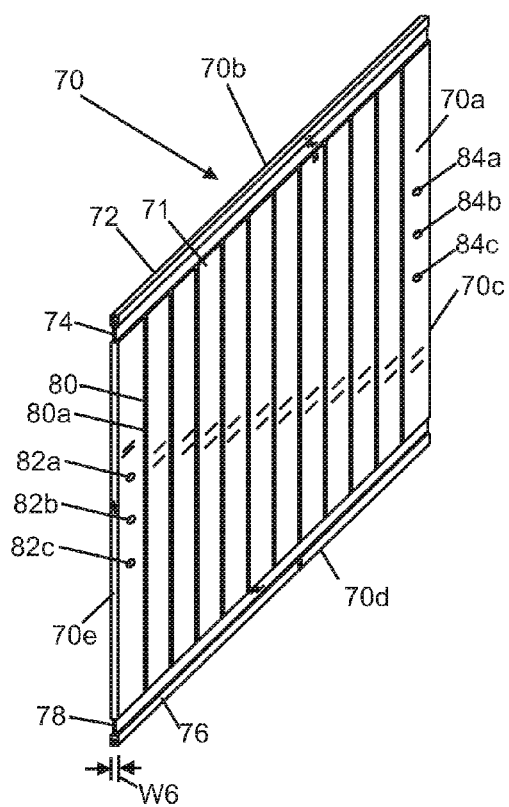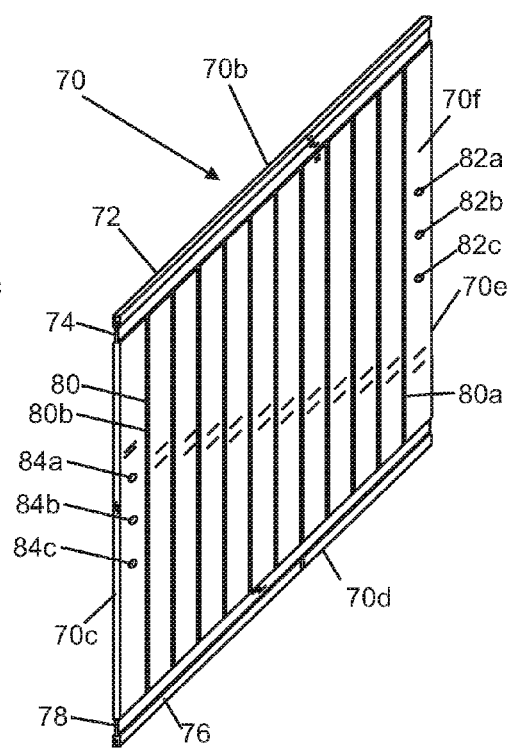

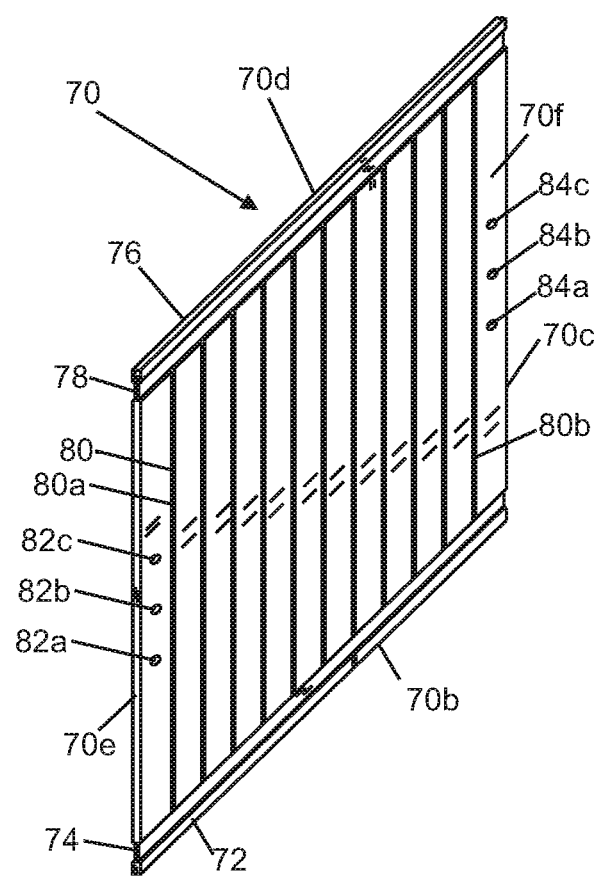

METHOD AND APPARATUS FOR CUTTING ITEMS

FIELD OF THE INVENTION

This invention relates to improved methods and apparatus concerning cutting items.

BACKGROUND OF THE INVENTION

There are various devices known for cutting items.

SUMMARY OF THE INVENTION

One or more embodiments of the present invention provide an apparatus for cutting an item, such as a roast, a bagel, or a loaf of bread, comprising a first wall device, a second wall device, a cutting board device, and a base.

The first wall device may have a plurality of vertical slots which are parallel to each other and spaced apart from each other. The second wall device may have a plurality of vertical slots which are parallel to each other and spaced apart from each other.

The first wall device may be configured to be attached to the base in a manner such that the first wall device projects out from the base, and is at an angle with respect to the base. The second wall device is configured to be attached to the base in a manner such that the second wall device projects out from the base, and is at angle with respect to the base.

The first wall device may have a top and a bottom edge. The second wall device may have a top and a bottom edge. The top and bottom edges of the first and second wall devices may be configured to be parallel to each other when the first and second wall devices are attached to the base. Each slot of the plurality of vertical slots of the first wall device may have a corresponding slot of the plurality of vertical slots of the second wall device.

Each slot of the plurality of vertical slots of the first wall device may have a first end and an opposing second end, wherein each first end of each slot of the plurality of vertical slots of the first wall device is closer to the base than its corresponding second end of each slot of the plurality of vertical slots of the first wall device, when the first wall device and the second wall device are attached to the base.

Each slot of the plurality of vertical slots of the second wall device may have a first end and an opposing second end, wherein each first end of each slot of the plurality of vertical slots of the second wall device is closer to the base than its corresponding second end of the plurality of vertical slots of the second wall device, when the first wall device and the second wall device are attached to the base.

Each first end of each slot of the plurality of vertical slots of the first wall device may be spaced apart by a lower chamber width, from each first end of its corresponding slot of the plurality of vertical slots of the second wall device, when the first and second wall devices are attached to the base.

A front plane of the base may be the approximately same distance away from the first end of each slot of the plurality of vertical slots of the first wall device as from each first end of its corresponding slot of the plurality of vertical slots of the second wall device, when the first and second wall devices are attached to the base.

The cutting board device may includes a cutting board body and a means for removably supporting the cutting board device by both the first wall device and the second wall device so that a first part of the cutting board device rests on the first wall device and a second part of the cutting board device rests on the second wall device to thereby support and suspend the cutting board body above and substantially parallel to the base, so that the cutting board body does not contact the base.

The means for removably supporting the cutting board device by both the first wall device and the second wall device may allow the cutting board body to be supported and suspended above and substantially parallel to the base at different heights above the base.

The means for removably supporting the cutting board device by both the first wall device and the second wall device may include first, second, third, and fourth pins which are fixed to and project out from the cutting board body, a first plurality of holes in the first wall device into any of which the first pin can be inserted, a second plurality of holes in the first wall device into any of which the second pin can be inserted, a third plurality of holes in the second wall device into any of which the third pin can be inserted, and a fourth plurality of holes in the second wall device into any of which the fourth pin can be inserted; and wherein the first pin is inserted into one of the first plurality of holes, the second pin is inserted into one of the second plurality of holes, the third pin is inserted into the third plurality of holes, and the fourth pin is inserted into the fourth plurality of holes to thereby supporting the cutting board device by both the first wall device and the second wall device.

The base may also be a cutting board, and the cutting board device may be configured to be removed from the apparatus and the base connected to the first wall device and the second wall device with the first wall device and the second wall device separated from each other.

The first wall device may be configured to be attached to the base by inserting the first wall device into a first slot of the base; the second wall device may be configured to be attached to the base by inserting the second wall device into a second slot of the base; and the first slot and the second slots of the base may be substantially parallel.

The base may have first, second, third, and fourth slots, which are parallel to each other and spaced apart from each other; wherein the first wall device may be configured to be attached to the base by inserting the first wall device into the first slot or the second slot of the base; and wherein the second wall device may be configured to be attached to the base by inserting the second wall device into the third slot or the fourth slot of the base.

The apparatus may further include a front plate and a rear plate; wherein the front plate is configured to be attached to a third slot of the base by inserting the front plate into the third slot of the base; wherein the rear plate is configured to be attached to a fourth slot of the base by inserting the rear plate into the fourth slot of the base; wherein the first slot and the second slots of the base are substantially perpendicular to the third and fourth slots of the base; and wherein the base, the first wall device, the second wall device, the front plate, and the cutting board body are configured to together enclose an inner chamber, except for the top which may be open, into which an item can be placed so that it rests on the base; and wherein the apparatus is configured to allow an item to be cut by inserting a knife through one of the plurality of vertical slots of the first wall device and its corresponding one of the plurality of vertical slots of the second wall device.

The apparatus may further include a top member, wherein the top member has first, second, third, and fourth slots; and wherein the top member is configured to be placed so that top edges of the first and second wall devices are inserted into the first and second slots of the top member, and top edges of the front and rear plates are inserted into the third and fourth slots, to attach the top member to the first and second wall devices, and the front and rear plates to further enclose the inner chamber by the base, top member, the first and second wall devices, and the front and rear plates.

The apparatus may include a plurality of plates; and wherein any particular plate of the plurality of plates is configured to be inserted into any one of the plurality of vertical slots of the first wall device and thereafter into its corresponding slot of the plurality of vertical slots of the second wall device, such that a first part of the particular plate sits in one of the plurality of vertical slots of the first wall device, a second part of the particular plate sits between the first wall device and the second wall device, and a third part of the particular plate sits in a corresponding one of the plurality of vertical slots of the second wall device.

In at least one embodiment, the cutting board body has a top surface which includes a plurality of grooves which are parallel to each other; and when the particular plate is between the first wall device and the second wall device the second part of the particular plate is configured to sit in one of the plurality of grooves.

A method is also provided which includes placing a first item on a cutting board device, which is suspended and supported above a base; inserting a knife so that a first part of the knife is in a vertical slot of a plurality of vertical slots of a first wall device, a second part of the knife is in between the first wall device and a second wall device and above the cutting board device, and a third part of the knife is in a corresponding vertical slot of a plurality of vertical slots of a second wall device; and using the knife to cut the first item by cutting through the first item until the knife contacts the cutting board device. The method may be used with an apparatus in one or more embodiments as previously specifies.

The method may further include removing the cutting board device so that it is no longer suspended and supported above the base; placing a second item on the base; inserting a knife so that a first part of the knife is in a vertical slot of a plurality of vertical slots of a first wall device, a second part of the knife is in between the first wall device and a second wall device and above the base, and a third part of the knife is in a corresponding vertical slot of a plurality of vertical slots of a second wall device; and using the knife to cut the second item by cutting through second item until the knife contacts the base.

BRIEF DESCRIPTION OF THE DRAWINGS

FIG. 2A shows a front, top, and right side view of a second plate for in accordance with one or more embodiments of the present invention;

FIG. 2B shows a rear, top, and left side view of the second plate of FIG. 2A;

FIG. 5A shows a front, top, and right side view of a first wall device for use in accordance with one or more embodiments of the present invention;

FIG. 5B shows a rear, top, and left side view of the first wall device of FIG. 5A;

FIG. 5C shows a front, bottom, and left side view of the first wall device of FIG. 5A;

DETAILED DESCRIPTION OF THE DRAWINGS

Figure 1A:
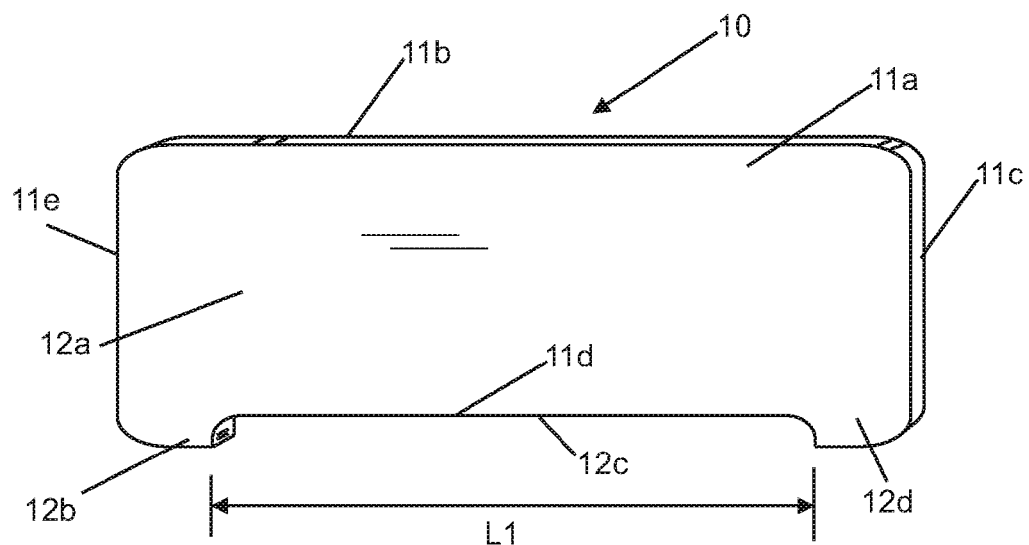
FIG. 1A shows a front, top, and right side view of a first plate for use in accordance with one or more embodiments of the present invention.
Figure 1B:
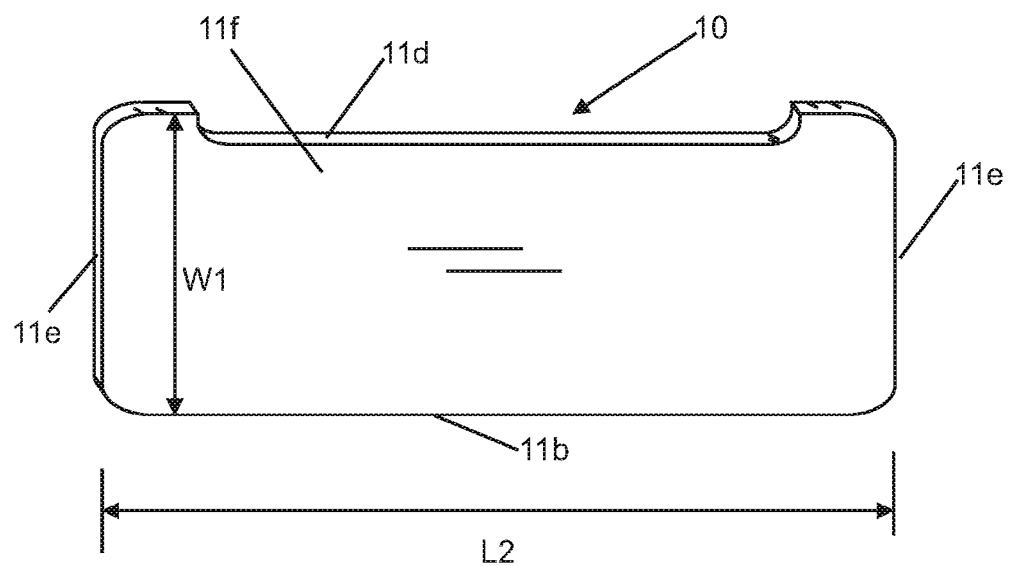
FIG. 1B shows a rear, bottom and left side view of the first plate of FIG. 1A.

FIG. 1A shows a front, top, and right side view of a first plate 10 for use in accordance with one or more embodiments of the present invention. FIG. 1B shows a rear, bottom and left side view of the first plate 10. The first plate 10 has a top edge 11b, a right edge 11c, a bottom edge 11d, a left edge 11e, a front surface 11a, and a rear surface 11f. The first plate 10 includes protruding regions or flanges 12b and 12d. There is a region or notch 12c between the regions 12b and 12d, which may have a length L1, which may be about four and one half inches; and the regions 12b and 12d may have a length in the same direction as L1, of three quarters of an inch. The length L2 of the first plate 10, shown in FIG. 1B, may be about six inches. The first plate 10 may be a flat solid rigid plate, made for example, of plastic. The first plate 10 may be made of a rigid but flexible material, which flexes, without being creased, and which when a flexing force is removed returns to its original shape. The first plate 10 may be transparent.

FIG. 2A shows a front, top, and right side view of a second plate 20 for use in accordance with one or more embodiments of the present invention. FIG. 2B shows a rear, top, and left side view of the second plate 20. The second plate 20 has a top edge 20b, a right edge 20c, a bottom edge 20d, a left edge 20e, a front surface 20a, and a rear surface 20f. The second plate 20 may include cutouts or notches 21a, 21b, 21c, and 21d which may have a width W4, which may be about three eighths of an inch. The second plate 20 may have protusions 22a and 22b, which may have a width W3 which may be about one eighth of an inch. The second plate 20 may have a width W2 which may be about four inches. The second plate 20 may be made of a rigid but flexible material, which flexes, without being creased, and which when a flexing force is removed returns to its original shape. The second plate 20 may be transparent.

Figure 3A:
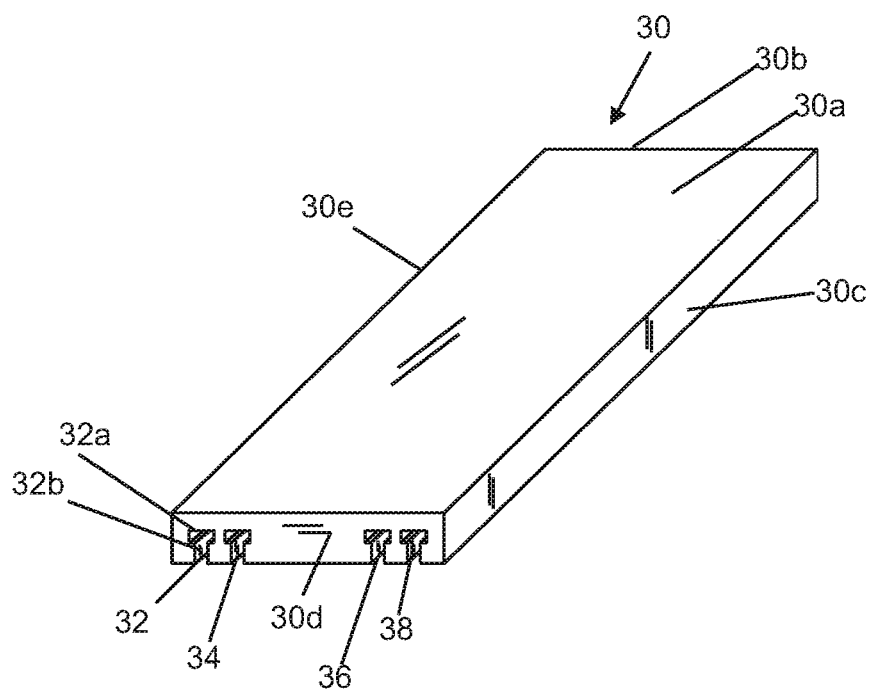
FIG. 3A shows a front, top, and right side view of a top for use in accordance with one or more embodiments of the present invention.
Figure 3B:
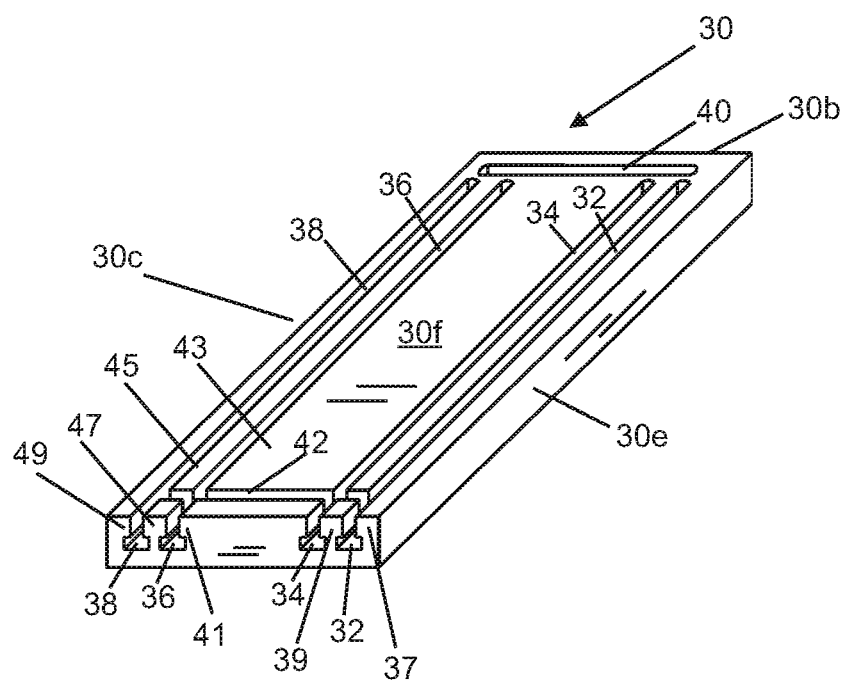
FIG. 3B shows a front, bottom, and left side view of the top of FIG. 3A.

FIG. 3A shows a front, top, and right side view of a top 30 for use in accordance with one or more embodiments of the present invention. FIG. 3B shows a front, bottom, and left side view of the top 30. The top or member 30 has a top surface 30a, a right edge 30c, a front surface 30d, a rear surface 30b, a left edge 30e, and a bottom surface 30f. The top or member 30 includes slots 32, 34, 36, 38 running lengthwise, and slots 40 and 42 running widthwise. The top member 30 also includes rails, protrusions or flanges 49, 47, 45, 43, 41, 39, and 37 which protrude or project over or into one or more of slots 32, 34, 36, 38, 40 and 42. The top 30 may be made entirely or substantially of a solid material which does not bend without breaking. The top 30 may be made entirely or substantially of of hard wood, hard plastic, or polyvinyl chloride board.

Figure 4A:
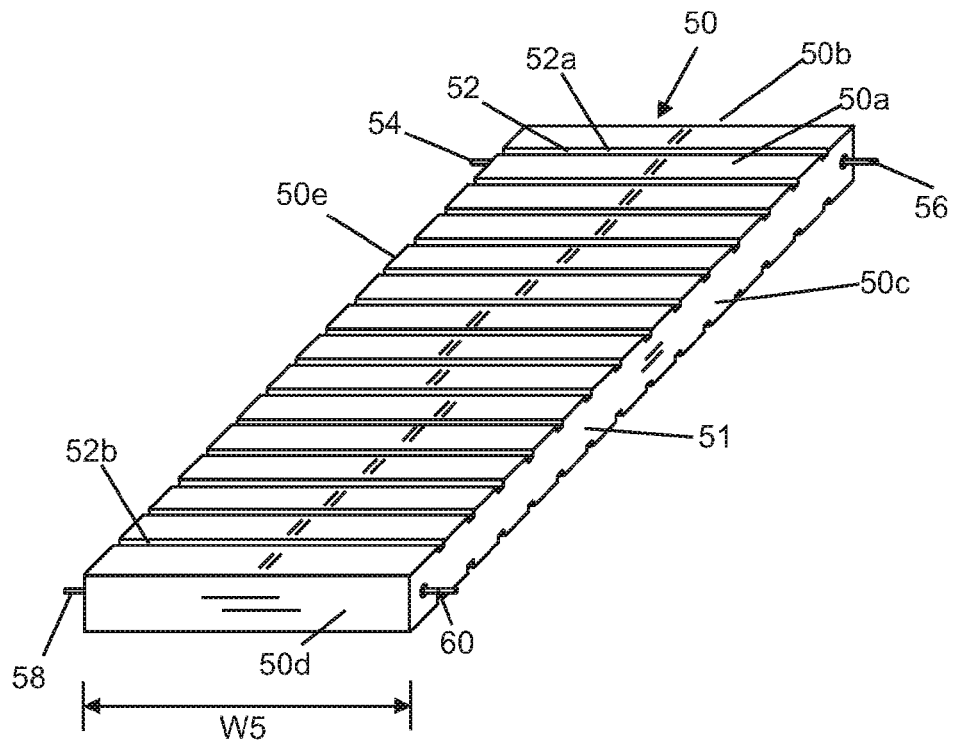
FIG. 4A shows a front, top, and right side view of a cutting board device for use in accordance with one or more embodiments of the present invention.
Figure 4B:
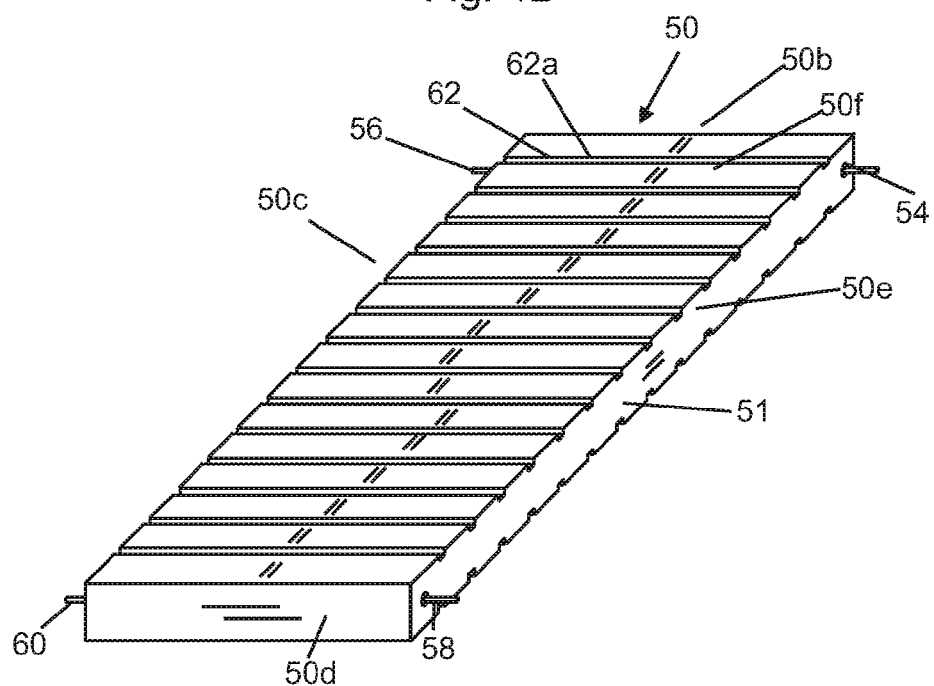
FIG. 4B shows a front, bottom, and left side view of the cutting board device of FIG. 4A.
Figure 4C:
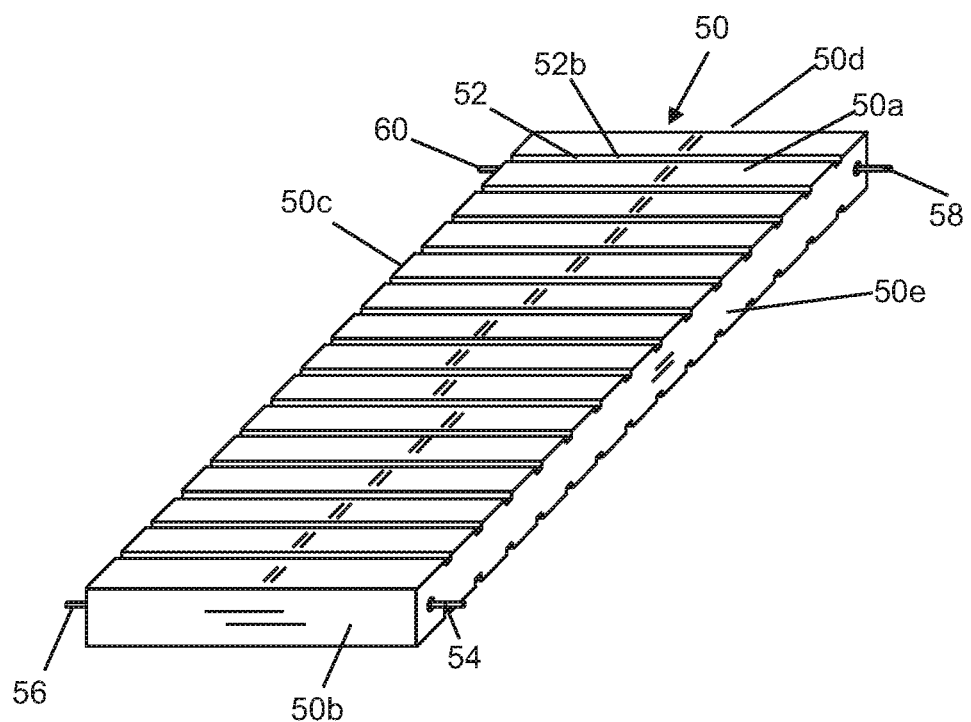
FIG. 4C shows a rear, top, and left side view of the cutting board device of FIG. 4A.

FIG. 4A shows a front, top, and right side view of a cutting board device 50 for use in accordance with one or more embodiments of the present invention. FIG. 4B shows a front, bottom, and left side view of the cutting board device 50. FIG. 4C shows a rear, top, and left side view of the cutting board device 50. The cutting board device 50 has a top surface 50a, a right edge 50c, a front surface 50d, a rear surface 50b, a left edge 50e, and a bottom surface 50f. The cutting board device 50 may include a plurality of slots 52 in the top surface 50a, including slots 52a and 52b. The cutting board device 50 may include a plurality of slots 62 in the bottom surface 50f, including slot 62a. The cutting board device 50 has pins 54, 56, 58, and 60 which project or protrude outwards perpendicular to the surfaces 50a and 50f, and are fixed to the body 51 of the cutting board device 50. The body 51 of the cutting board device (i.e. typically not including pins 54, 56, 58, and 60, may be made of hard wood, hard plastic, or a hard polyvinyl chloride board. The pins 54, 56, 58, and 60 may be made of a rigid metal.

FIG. 5A shows a front, top, and right side view of a first wall device 70 for use in accordance with one or more embodiments of the present invention. FIG. 5B shows a rear, top, and left side view of the first wall device 70. FIG. 5C shows a front, bottom, and left side view of the first wall device 70. The first wall device 70 may be made of a rigid material, which can be flexed, without creasing, and when after being flexed returns to its original form. The first wall device 70 may be transparent.

The first wall device 70 has a top edge 70b, a right surface 70a, a front edge 70e, a rear edge 70c, a left surface 70f, and a bottom edge 70d. The first wall device has a plurality of slots 80, which are shown as eleven slots in FIGS. 5A-5C, which have more or less slots in different embodiments, and which include slots 80a, and 80b. The first wall device 70 has a plurality of openings, including openings 82a, 82b, 82c, 84a, 84b, and 84c, wherein any of pins 54, 56, 58, and 60 can be inserted into any one of the openings 82a-c, and 84a-c. The first wall device 70 has protruding rails 72 and 76, and indented member or sections 74 and 78. The first wall device 70 has a body portion 71 through which the plurality of slots 80 pass through.

Figure 6A:
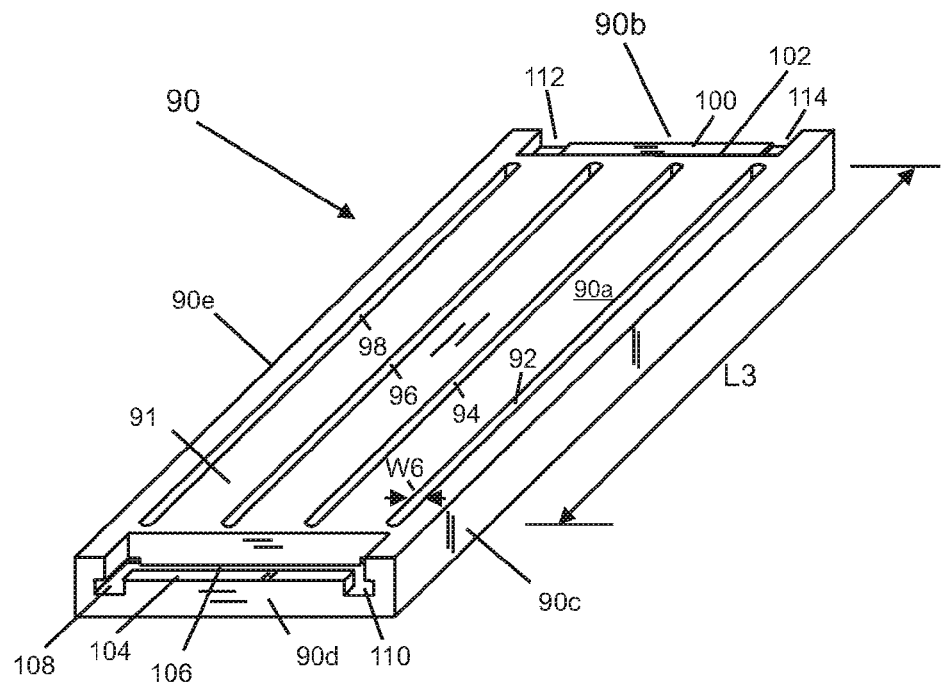
FIG. 6A shows a front, top, and right side view of a base for use in accordance with one or more embodiments of the present invention.
Figure 6B:
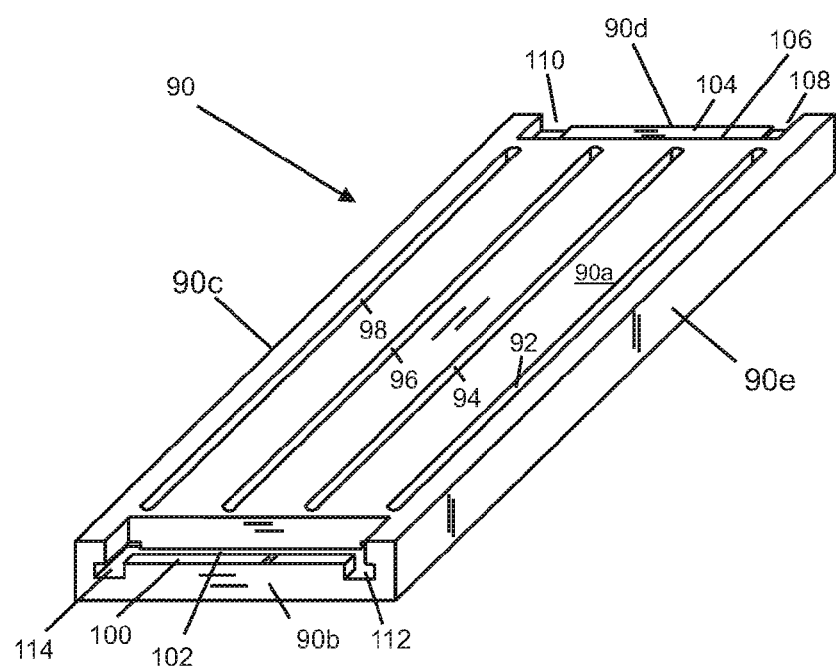
FIG. 6B shows a rear, top, and left side view of the base of FIG. 6A.
Figure 6C:
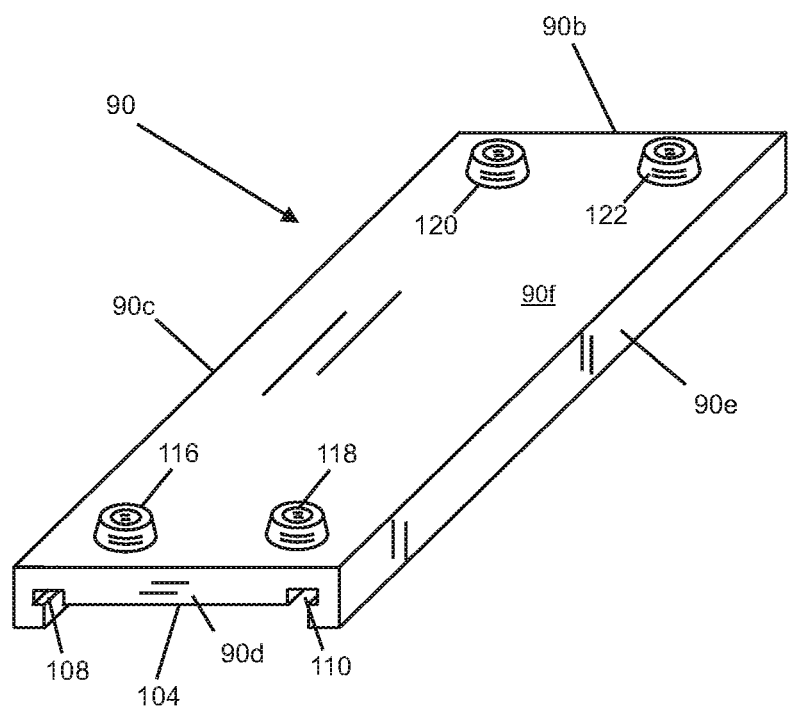
FIG. 6C shows a front, bottom, and left side view of the first wall device of FIG. 6A.

FIG. 6A shows a front, top, and right side view of a base 90 for use in accordance with one or more embodiments of the present invention. FIG. 6B shows a rear, top, and left side view of the base 90. FIG. 6C shows a front, bottom, and left side view of the base 90. The base 90 has a top surface 90a, a right surface 90c, a front edge 90d, a rear edge 90b, a left surface 90e, and a bottom surface 90f. The base 90 has slots 92, 94, 96, and 98 running lengthwise in a direction of L3, where L3 may be about eleven and one quarter inches long. The base 90 may have slots 102 and 106 located between body portion 91 and protruding sections 100 and 104, respectively, wherein slots 102 and 106, in at least one embodiment are perpendicular or substantially perpendicular to slots 92, 94, 96, and 98. Slots 92, 94, 96, and 98 are parallel or substantially parallel to each other. The base 90 includes indentations 108, 110, 112, and 114. Each of slots 92, 94, 96, and 98 may have a width W6, which may be about one quarter of an inch, and a length L3, which may be about ten inches, and these dimensions are configured to receive the first wall device 70 in the manner shown in FIG. 7, so that there is a snug fit and the first wall device 70 will freely stand up without any assistance perpendicular or substantially perpendicular to the base 90.

The base 90, as shown in FIG. 6C, legs, stoppers, or bases 116, 118, 120, and 122, each of which may be fixed to the bottom surface 90f of the base device 90. The legs 116, 118, 120, and 122 can be used to contact a counter surface to prevent the base device 90 from scratching the surface when in the upright position of FIG. 6A.

Figure 7:
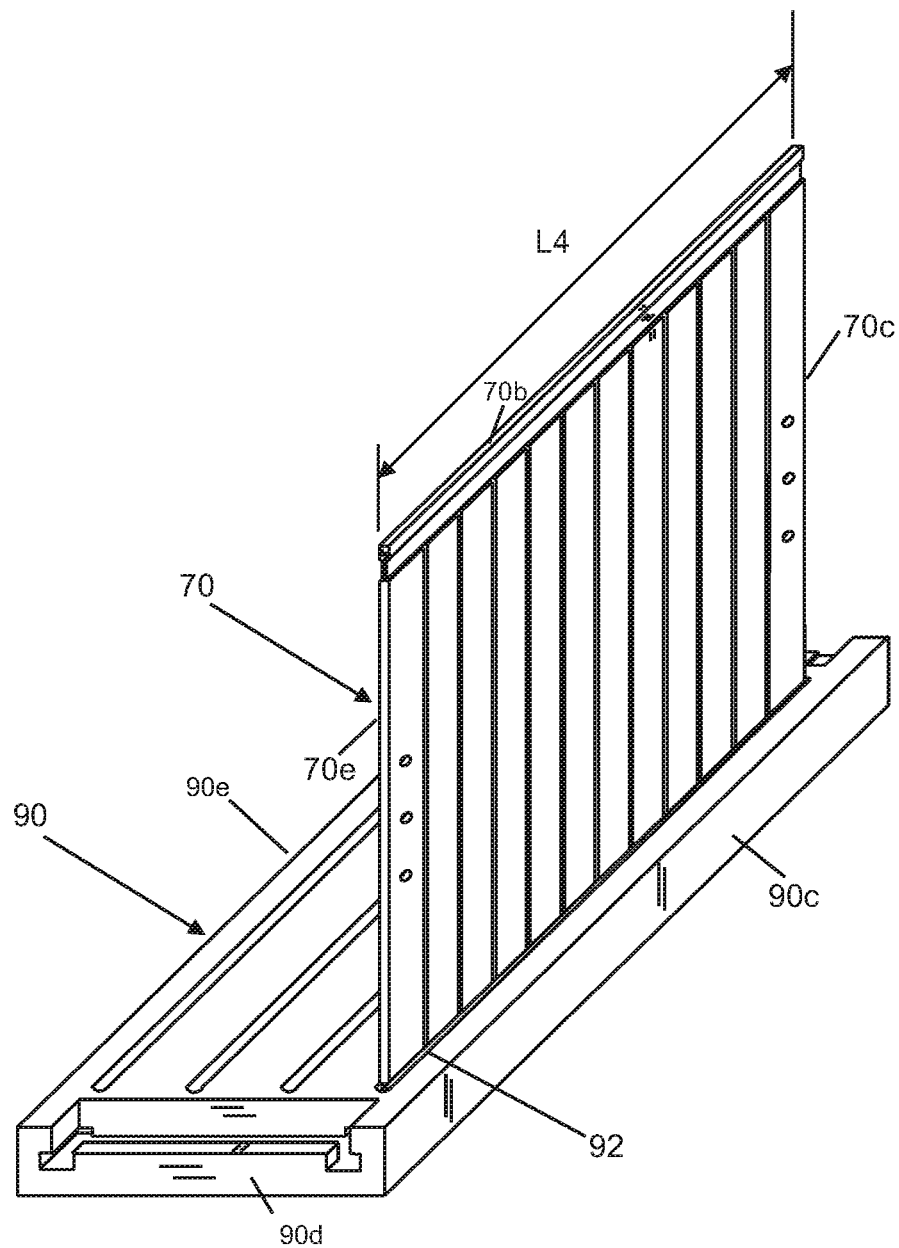
FIG. 7 shows a front, top, and right side view of the first wall device of FIG. 5A inserted into a first slot of the base of FIG. 6A, with the first wall device of FIG. 5A shown standing straight up or perpendicular to the base of FIG. 6A.

FIG. 7 shows a front, top, and right side view of the first wall device 70 inserted into slot 92 of the base 90, with the first wall device 70 shown standing straight up or perpendicular to the base 90. The length L4 of the first wall device 70 may be slightly less than the length L3 of the slot 92 to provide a snug fit.

Figure 8:
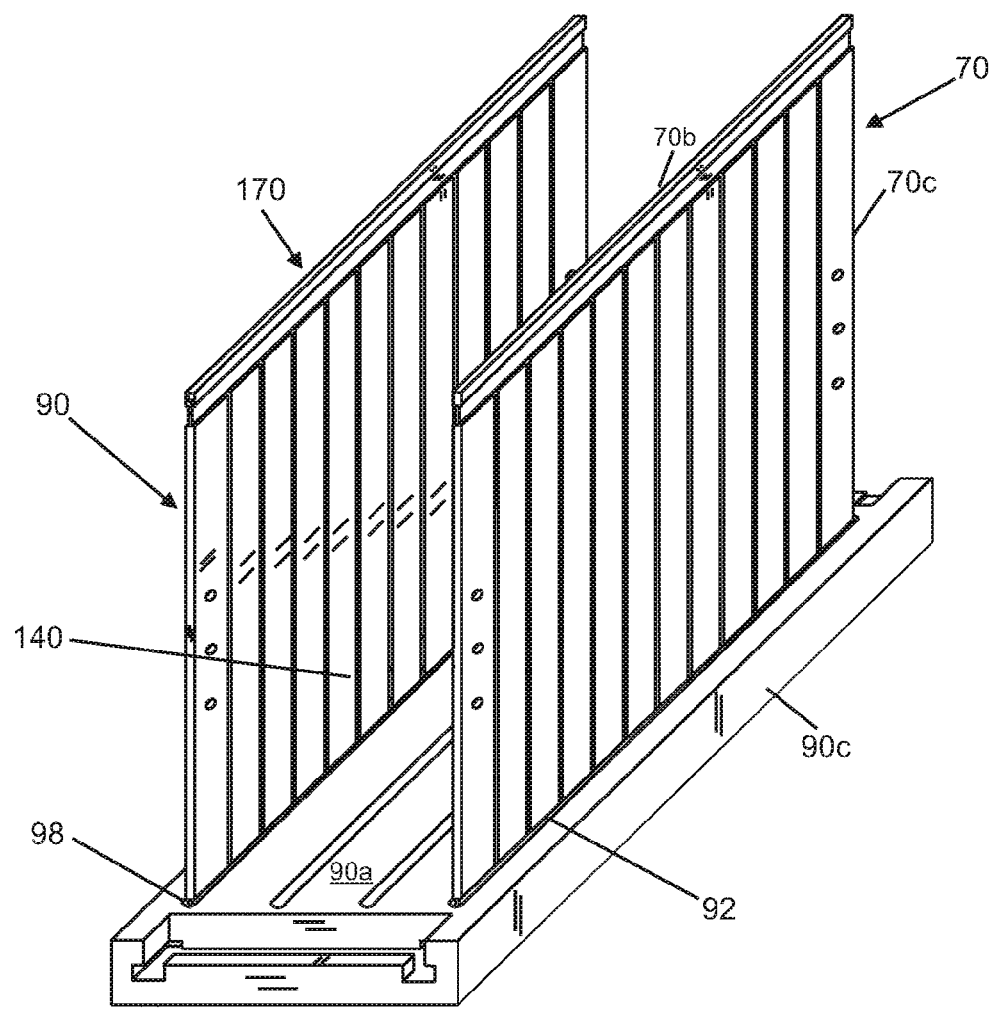
FIG. 8 shows a front top and right side view of the first wall device of FIG. 5A inserted into the first slot of the base of FIG. 6A, and a second wall device, identical to the first wall device, inserted into a second slot of the base of FIG. 6A.

FIG. 8 shows a front top and right side view of the first wall device 70 inserted into the slot 92 of the base 90, and a second wall device 170, identical to the first wall device 70, inserted into a second slot 98 of the base 90.

Figure 9:
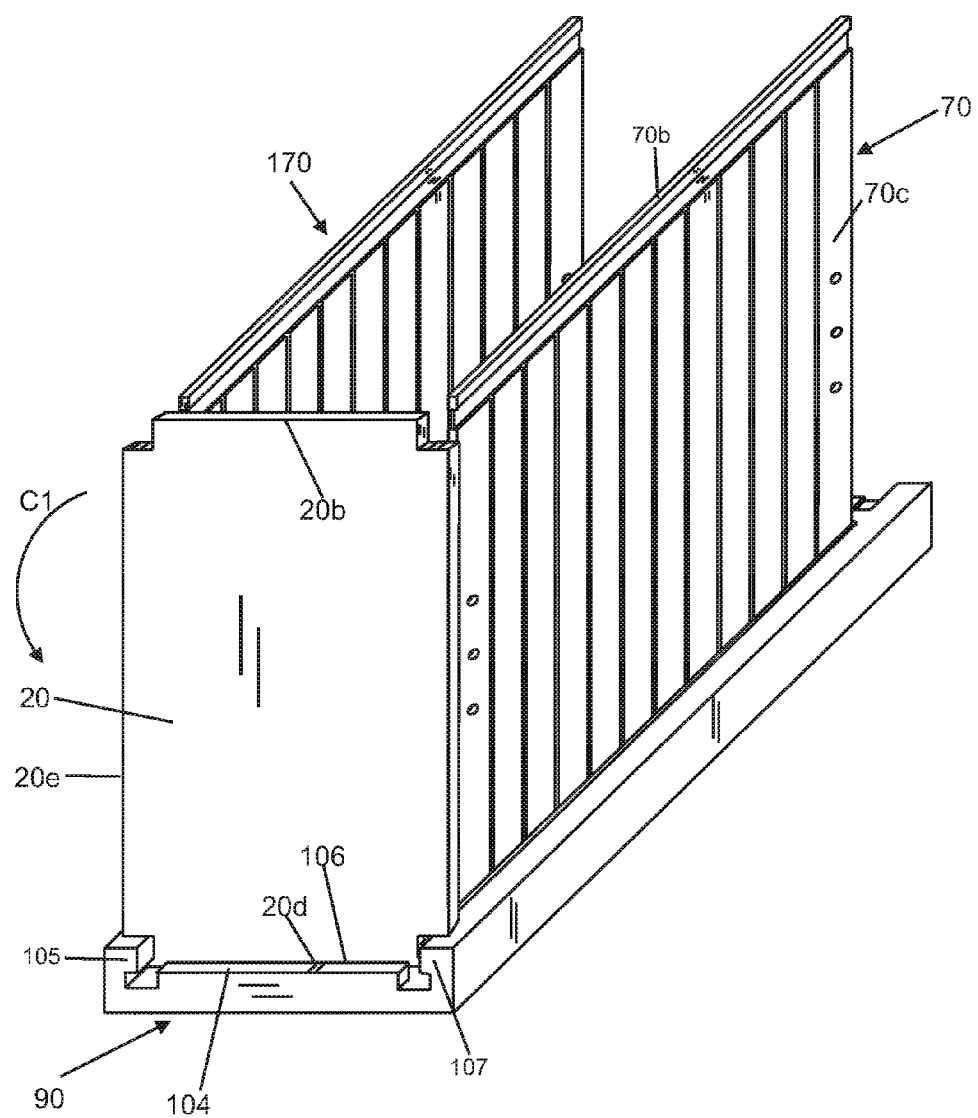
FIG. 9 shows the first and second wall devices of FIG. 8 inserted into the base of FIG. 6A as in FIG. 8, and the second plate of FIG. 2A inserted into a third slot of the base of FIG. 6A.

FIG. 9 shows the first and second wall devices 70 and 170 into the base 90, and the plate 20 inserted into slot 106, between body portion 91 and protruding portion 104 of the base 90. The protrusions 22a, and 22b are configured to fit under flanges 105 and 107 so that the plate 20 will be held and can be rotated, in a counterclockwise direction C1, shown in FIG. 9, in a hinge manner, to allow an item to be inserted into an inner chamber 140 shown in FIG. 8, bounded by at least parts of first wall device 70 and second wall device 170.

Figure 10:
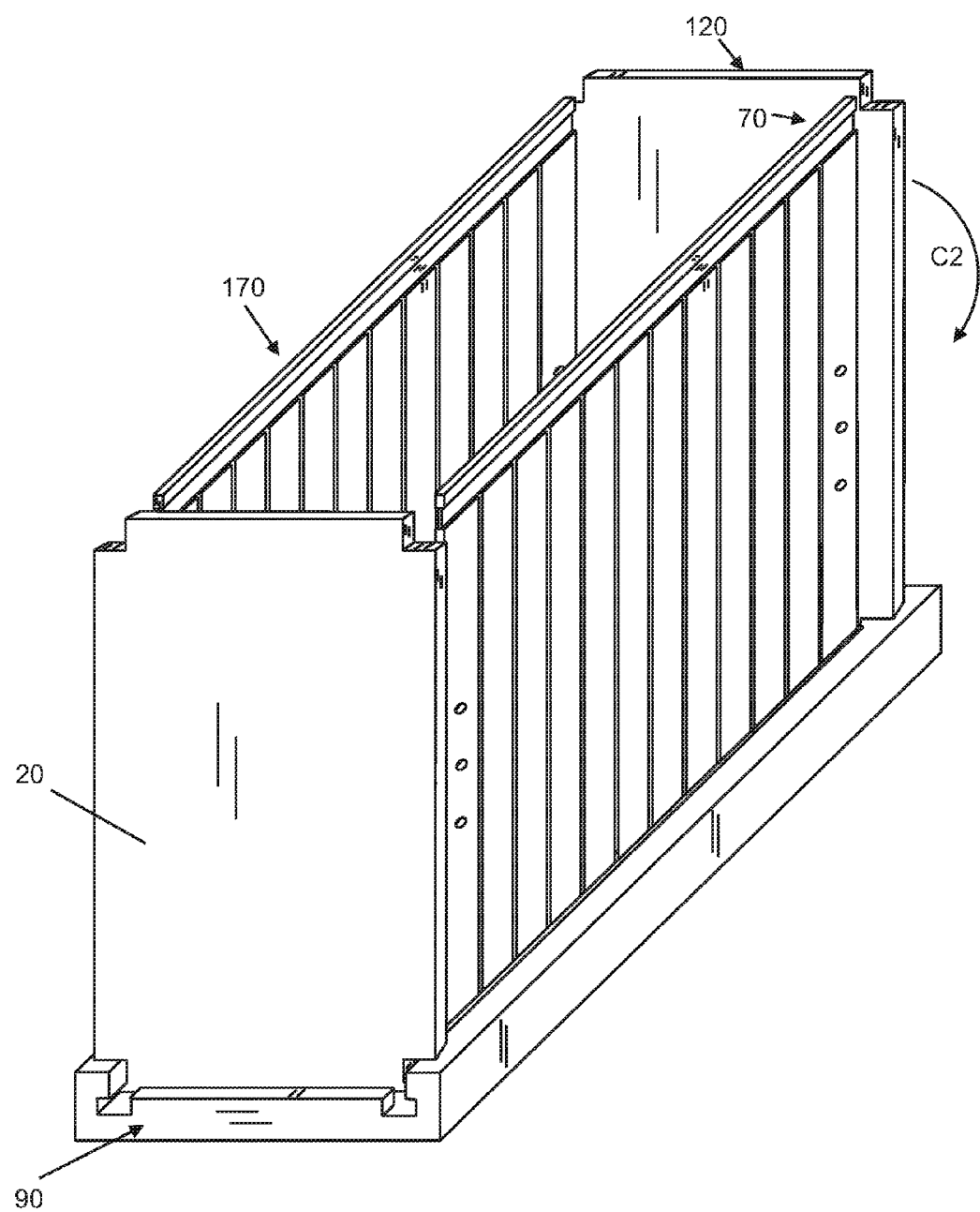
FIG. 10 shows the first and second wall devices of FIG. 8 inserted into the base of FIG. 6A as in FIG. 9, and the second plate of FIG. 2A inserted into the base of FIG. 6A as in FIG. 9, and a third plate, identical to the second plate of FIG. 2A, inserted into a fourth slot of the base of FIG. 6A.

FIG. 10 shows the first and second wall devices 70 and 170 inserted into the base 90 as in FIG. 9, and the plate 20 into the base 90 as in FIG. 9, and a plate 120, identical to the plate 20 inserted into the slot 102 of the base 90. The plate 120 is inserted, in a similar or identical manner to the plate 20, so that plate 120 will be held and can be rotated, in a clockwise direction C2, shown in FIG. 10, in a hinge manner, to allow an item to be inserted into an inner chamber 140 shown in FIG. 8, bounded by at least parts of first wall device 70 and second wall device 170.

Figure 11:
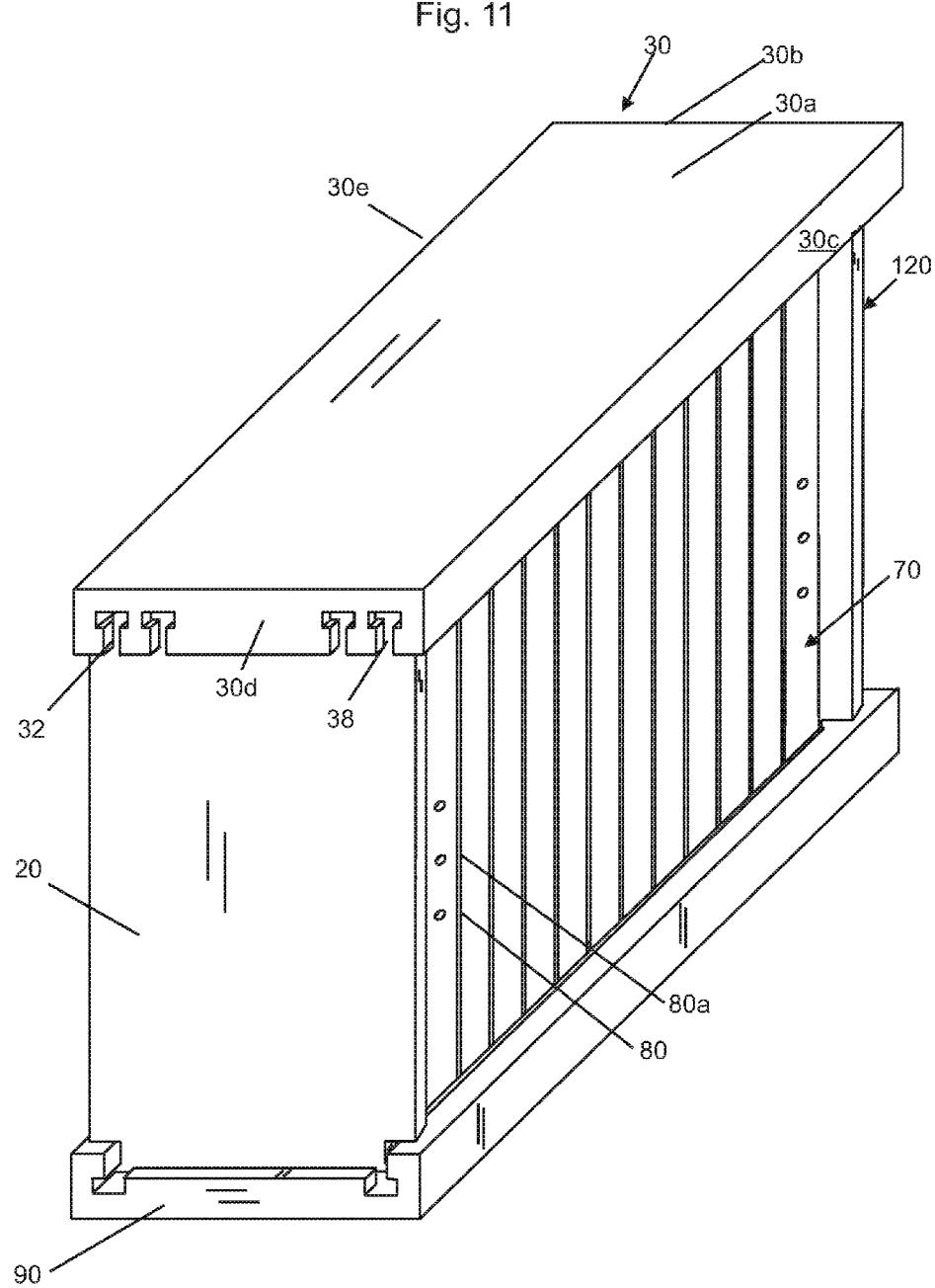
FIG. 11 shows the configuration of FIG. 10, with the addition of the top of FIG. 3A, applied so that the second plate of FIG. 2A, the third plate identical to the second plate, the first wall device of FIG. 5A, and the second wall device identical to the first wall device, are inserted into slots of the top of FIG. 3A.

FIG. 11 shows the configuration of FIG. 10, with the addition of the top 30 applied so that the plate 20, the plate 120, the first wall device 70, and the second wall device 170, are inserted into slots 42, 40, 38, 32, of the top 30 of FIG. 3A. This helps to hold the first wall device 70, second wall device 170, and plates 20 and 120 in the upright position and configuration of FIG. 11.

Figure 12:
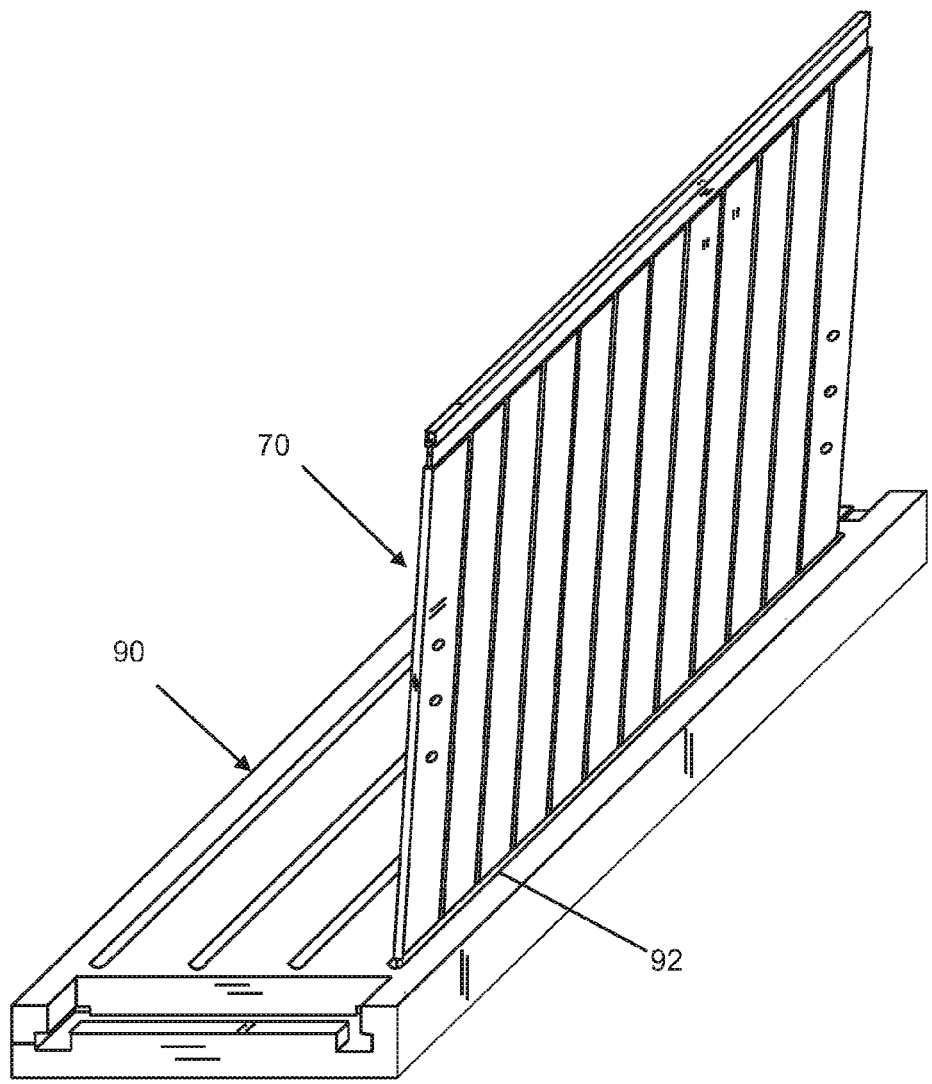
FIG. 12 shows a front, top, and right side view of the first wall device of FIG. 5A inserted into the first slot of the base of FIG. 6A, with the first wall device of FIG. 5A bent, angled or slanted to the right.

FIG. 12 shows a front, top, and right side view of the first wall device 70 of FIG. 5A inserted into the slot 92 of the base 90, with the first wall device 70 flexed to the right. The flexing of the first wall device 70 may be done by a person pushing the top of the first wall device 70 outwards, and the first wall device 70 may return to its original form and to an upright position shown in FIG. 7, when a flexing force is not applied.

Figure 13:
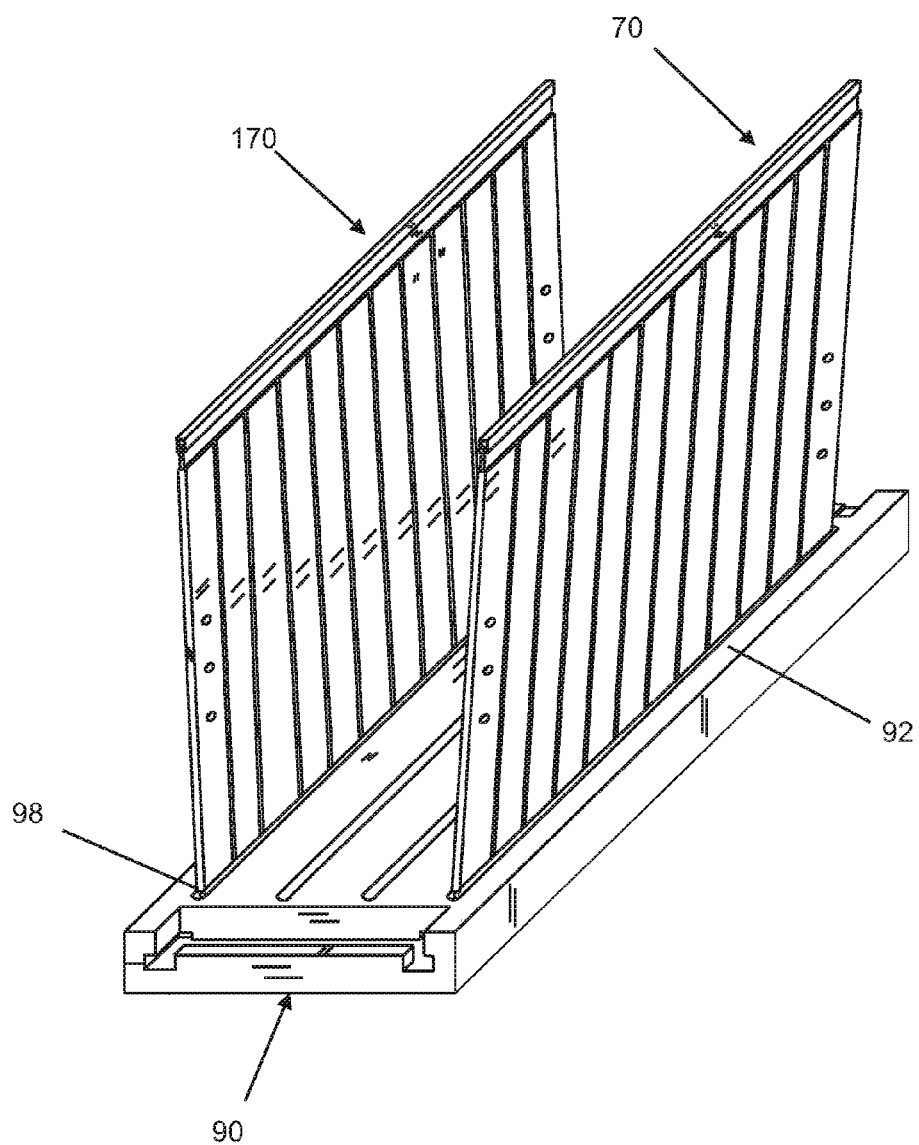
FIG. 13 shows a front top and right side view of the first wall device of FIG. 5A inserted into the first slot of the base of FIG. 6A, and the second wall device, identical to the first wall device, inserted into the second slot of the base of FIG. 6A, with the first wall device of FIG. 5A shown bent outwards or to the right and the second wall device shown bent outwards, away from the first wall device, or to the left.

FIG. 13 shows a front top and right side view of the first wall device 70 inserted into the first slot 92 of the base 90, and the second wall device 170, inserted into the slot 98 of the base 90, with the first wall device 70 shown flexed outwards or to the right and the second wall device 170 shown flexed outwards, away from the first wall device 70 or to the left. The flexing of the second wall device 170 and the first wall device 70 may be done by a person pushing the top of the second wall device 170 and the first wall device 70 outwards, and the first wall device 70 and the second wall device 170 may return to their original form and to an upright position shown in FIG. 8, when a flexing force is not applied.

Figure 14:
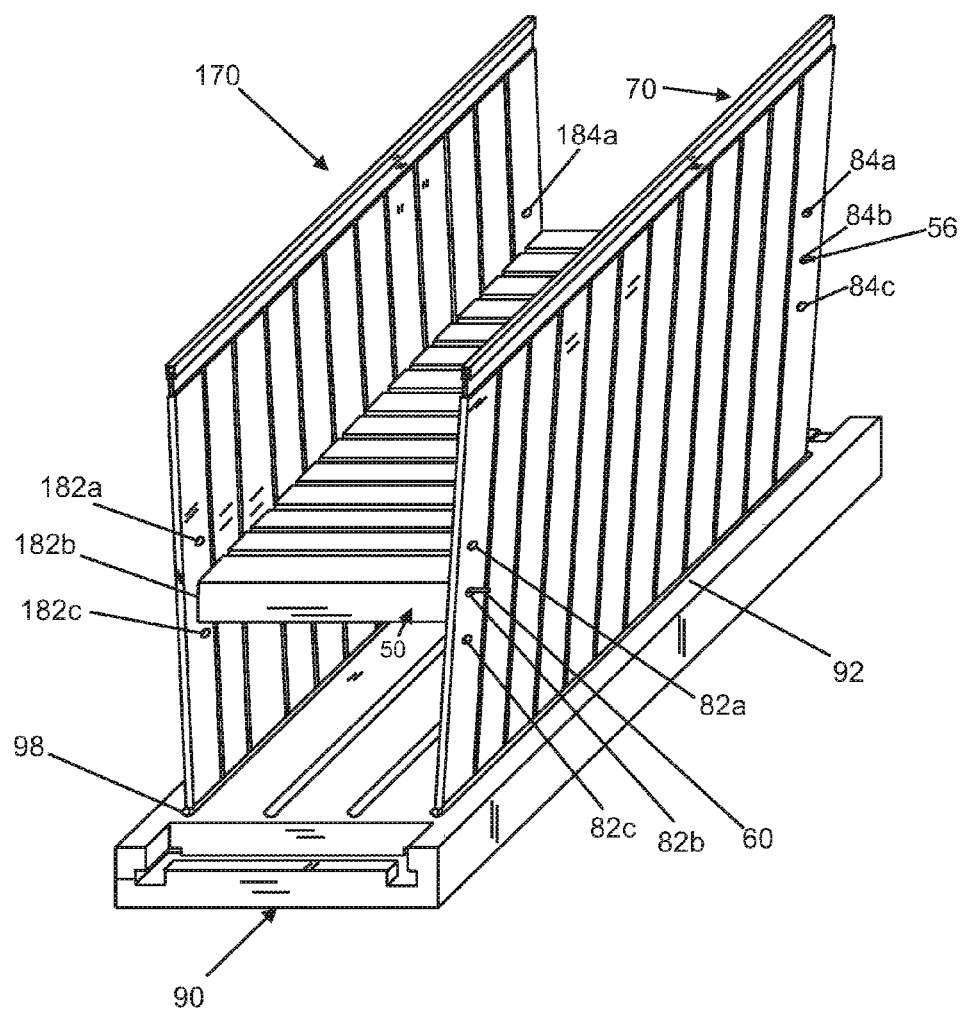
FIG. 14 shows the configuration of FIG. 13 along with the cutting board device of FIG. 4A inserted.

FIG. 14 shows the configuration of FIG. 13 along with the cutting board device 50 inserted, such that pins 60 and 58 are inserted into openings 82b and 182b, and pins 56 and 54 are inserted into openings 84b and an opening in second wall device 170 corresponding to opening 84b, to hold the cutting board device 50 in the location shown in FIG. 14. In the configuration of FIG. 14, the body portion 51 of the cutting board device 50 keeps the first wall device 70 and the second wall device 170 in a flexed state, because the width W5 of the cutting board device 50, shown in FIG. 4A, is of such a dimension that it causes flexing of the devices 70 and 170 by the cutting board device 50 contacting devices 70 and 170 and effectively forcing a larger dimension.

Figure 15:
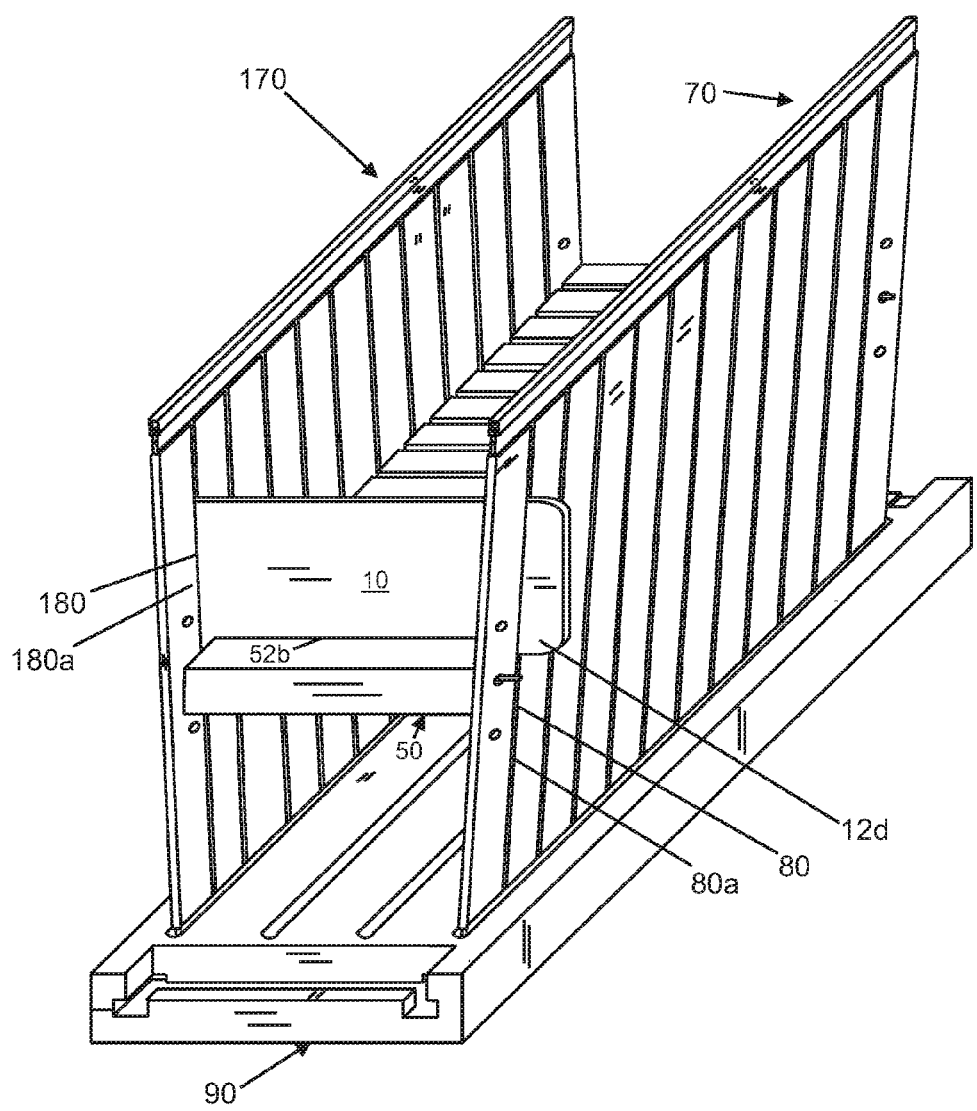
FIG. 15 shows the configuration of FIG. 14 along with the first plate inserted through corresponding slots of the first and second wall devices.

FIG. 15 shows the configuration of FIG. 14 along with the plate 10 inserted through corresponding slots 80a and 180a of the first and second wall devices 70 and 170 respectively. The plate 10 is also inserted into slot 52b of the cutting board device 50, and along with protruding section 12d and section 12b (not shown in FIG. 15), this holds the plate 10 in place in the FIG. 15 configuration.

Figure 16:
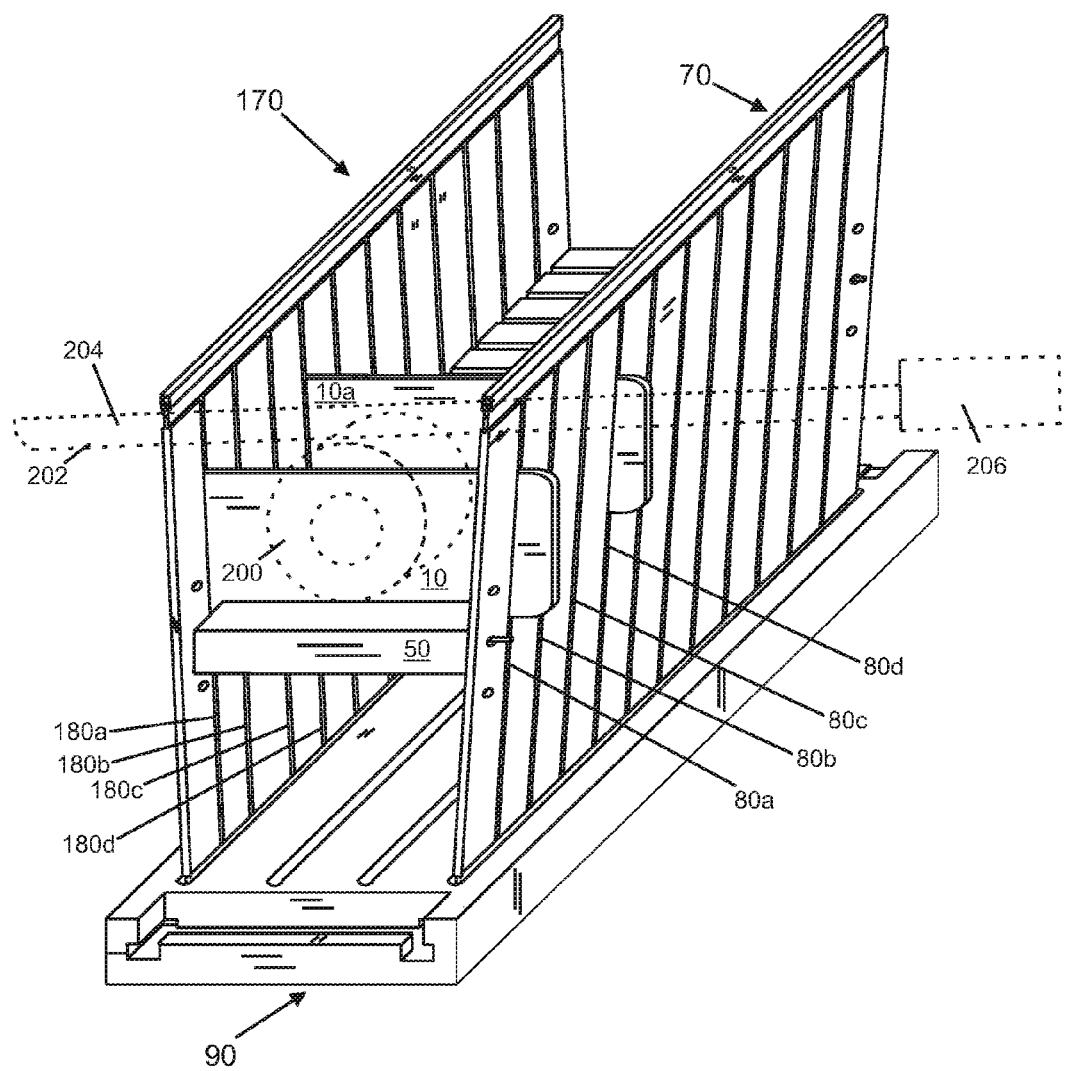
FIG. 16 shows the configuration of FIG. 15 along with a plate identical to the first plate inserted through corresponding slots of the first and second wall devices, with a bagel shown by dashed lines inserted between the first plate and the plate identical to the first plate, and with a knife shown by dashed lines inserted through slots of the first and second wall device to cut the bagel.

FIG. 16 shows the configuration of FIG. 15 along with plate 10a identical to the first plate 10, inserted through corresponding slots 80d and 180d, of the first and second wall devices 70 and 170, respectively, with a bagel 200 shown by dashed lines inserted between the first plate 10 and the plate 110a identical to the first plate 10, and with a knife 202 shown by dashed lines, having a blade 204 inserted through slots 80c and 180c of the first and second wall devices 70 and 170 to cut the bagel 200. The knife 202 has a handle 206. The two plates 10 and 10a hold the bagel 200 firmly in place, and the separation between plates 10 and 10a can be changed, for example, by changing the location of plate 10a, such as by inserting plate 10a into a different slot, such as slot 80c or 80b, and corresponding slots 180c and 180b. This allows items of different sizes to be held tightly while being cut.

Figure 17:
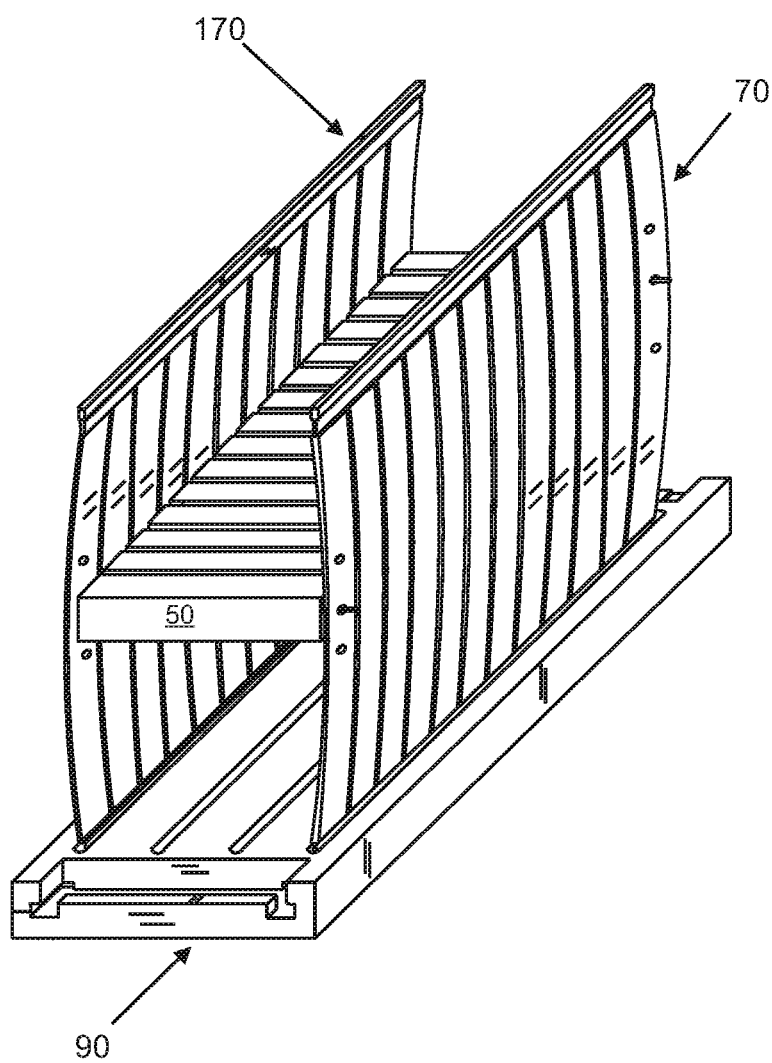
FIG. 17 shows the configuration of FIG. 14, except that the first wall device of FIG. 5A and the second wall device have been bent back towards each other.

FIG. 17 shows the configuration of FIG. 14, except that the first wall device 70 of FIG. 5A and the second wall device 170 have been flexed back towards each other. In FIG. 17, the cutting board device 50 has flexed the devices 70 and 170 outward, and then a force, such as applied by a person has flexed the top ends of devices 70 and 170 back inwards.

Figure 18:
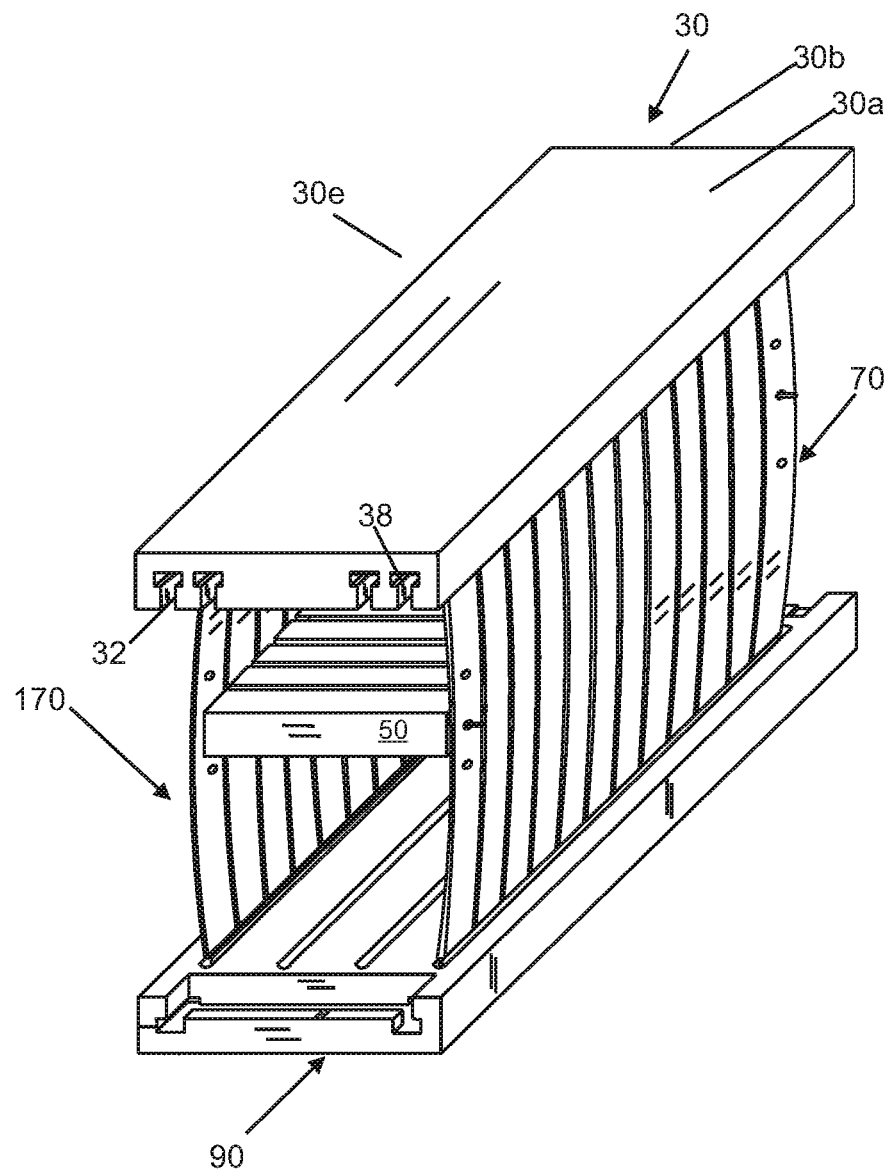
FIG. 18 shows the configuration of FIG. 17 along with the top of FIG. 3A situated so that the first wall device and the second wall device are inserted into slots of the top.

FIG. 18 shows the configuration of FIG. 17 along with the top 30 situated so that the first wall device 70 and the second wall device 170 are inserted into slots 38 and 32 of the top 30; and this holds the wall devices 70 and 170 in the flexed out then flexed back in position of FIG. 17.

Figure 19:
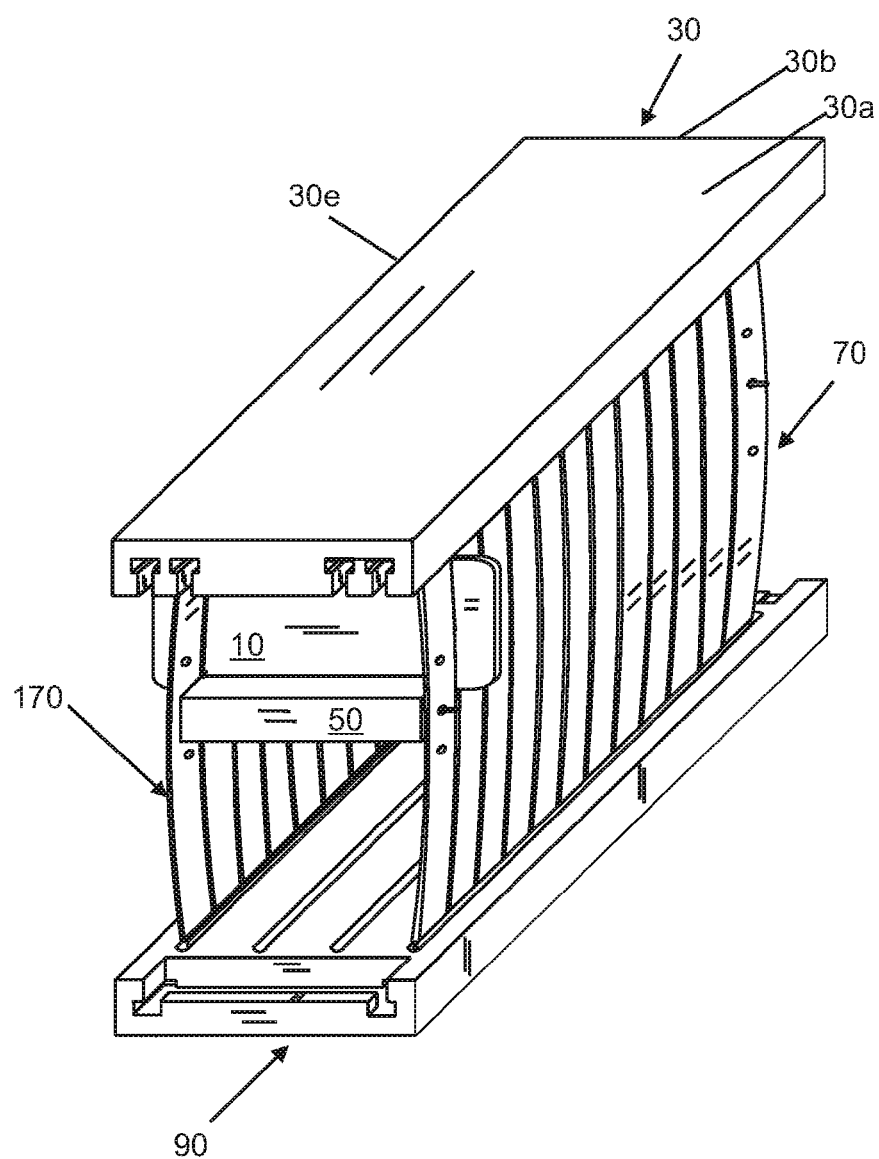
FIG. 19 shows the configuration of FIG. 18 along with the first plate of FIG. 1A inserted though corresponding slots of the first wall device of FIG. 5A and the second wall device.

FIG. 19 shows the configuration of FIG. 18 along with the first plate 10 inserted though corresponding slots of the first wall device 70 and the second wall device 170. A second plate 10a can be inserted in a similar or identical manner to FIG. 16, and an item, such as donut or bagel 200 can be inserted between the plates 10 and 10a and then the item, such as a food item, can be cut by knife 202 in the manner described for FIG. 16. Although, not shown in FIG. 19, the plates 20 and 120 can be placed as done with respect to FIG. 11.

The configuration of FIG. 11, i.e. without the cutting board device 50, can be used, in one or more embodiments, to cut a large heavy meat roast into steaks, by placing the large heavy meat roast on the top surface 90a of the base 90, such as in the configuration of FIG. 8, then putting plates 20 and 120, and top 30 on as in FIG. 11 configuration, and inserting a knife (such as knife 202 in FIG. 16), through one of slots 80, such as slot 80a, in wall device 70, and then through a corresponding slot of slots 180 of wall device 170, such as slot 180a (not shown in FIG. 11, but shown in FIG. 16. In the configuration of FIG. 11, without the cutting board device 50, the base 90 is used as a cutting board or cutting board device.

The configuration of FIG. 11, i.e. without the cutting board device 50 can be used for sizing considerations, i.e. if the distance or width between the wall devices 70 and 170 in FIG. 11 embodiment, provides a snug fit for cutting something or if the larger overall area, provided by not having the cutting board device 50 is needed, then the configuration of FIG. 11 may be used.

The configuration of FIG. 16, i.e. with the cutting board device 50 may be used for items that are wider, because the cutting board device 50 spreads or flexes the wall devices 70 and 170 further apart from each other. The configuration of FIG. 16, i.e. with the cutting board device 50 can also be used for cutting something with a smaller overall size or area, i.e. a bagel, or donut as opposed to a large meat roast. The different holes 82*a-c*, 84*a-c*, 182*a-c*, and 184*a-c*, allow the distance, spacing or width between the wall devices 70 and 170 to be different amounts, wherein generally if the cutting board device 50 is closer to the base 90, the devices 70 and 170 will be flexed further apart from each other. This provides different widths for enclosing snugly different items for cutting.

An apparatus including one or more of components 10, 20, 30, 50, 70, 90, 10*a*, 120, 150, and 170 can be used to cut roasts into steaks, breads of all sizes, and types. For a long item, such as a long Italian bread, the configuration shown in FIG. 11, without the cutting board device 50, may be appropriate, because the ends of the long Italian bread may be held in place by the plates 20 and 120, even though the Italian bread is relatively light weight. Other long loaves of bread may be able to be held by plates 20 and 120 without the use of cutting board device 50, and allowing greater overall area in the inner chamber cutting area enclosed by wall devices 70, 170, plates 20 and 120, and top or cover 30.

The cutting board device or center board 50 may be used for cutting wider loaves of bread, because cutting board device 50 flexes the wall devices 70 and 170 to provide greater widths. For example, some wider loaves of rye bread, whole wheat bread, home baked white bread, bagels, and English muffins may be appropriate for cutting with device 50 in the configuration of FIG. 16.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising the steps of
    placing a first item on a cutting board device, which is suspended and supported above a base; and
    inserting a knife so that a first part of the knife is in a vertical slot of a plurality of vertical slots of a first wall device, a second part of the knife is in between the first wall device and a second wall device and above the cutting board device, and a third part of the knife is in a corresponding vertical slot of a plurality of vertical slots of a second wall device;
    and using the knife to cut the first item by cutting through the first item until the knife contacts the cutting board device; and
    wherein the plurality of vertical slots of the first wall device are parallel to each other and spaced apart from each other;
    wherein the plurality of vertical slots of the second wall device are parallel to each other and spaced apart from each other;
    wherein the first wall device is configured to be attached to the base in a manner such that the first wall device projects out from the base, and is at an angle with respect to the base;
    wherein the second wall device is configured to be attached to the base in a manner such that the second wall device projects out from the base, and is at angle with respect to the base;
    wherein the first wall device has a top and a bottom edge;
    wherein the second wall device has a top and a bottom edge;
    wherein the top and bottom edges of the first and second wall devices are configured to be parallel to each other when the first and second wall devices are attached to the base;
    wherein each slot of the plurality of vertical slots of the first wall device has a corresponding slot of the plurality of vertical slots of the second wall device;
    wherein each slot of the plurality of vertical slots of the first wall device has a first end and an opposing second end, wherein each first end of each slot of the plurality of vertical slots of the first wall device is closer to the base than its corresponding second end of each slot of the plurality of vertical slots of the first wall device, when the first wall device and the second wall device are attached to the base;
    wherein each slot of the plurality of vertical slots of the second wall device has a first end and an opposing second end, wherein each first end of each slot of the plurality of vertical slots of the second wall device is closer to the base than its corresponding second end of the plurality of vertical slots of the second wall device, when the first wall device and the second wall device are attached to the base;
    wherein each first end of each slot of the plurality of vertical slots of the first wall device is spaced apart by a lower chamber width, from each first end of its corresponding slot of the plurality of vertical slots of the second wall device, when the first and second wall devices are attached to the base;
    wherein a front plane of the base is the approximately same distance away from the first end of each slot of the plurality of vertical slots of the first wall device as from each first end of its corresponding slot of the plurality of vertical slots of the second wall device, when the first and second wall devices are attached to the base; and
    wherein the cutting board device includes a cutting board body and a means for removably supporting the cutting board device by both the first wall device and the second wall device so that a first part of the cutting board device rests on the first wall device and a second part of the cutting board device rests on the second wall device to thereby support and suspend the cutting board body above and substantially parallel to the base, so that the cutting board body does not contact the base
    wherein the means allows the cutting board body to be supported and suspended above and substantially parallel to the base at different heights above the base,
    wherein the means includes first, second, third, and fourth pins which are fixed to and project out from the cutting board body and wherein the first wall device includes first and second plurality of holes and the second wall device includes third and fourth plurality of holes, and
    wherein the first pin is inserted into one of the first plurality of holes, the second pin is inserted into one of the second plurality of holes, the third pin is inserted into one of the third plurality of holes, and the fourth pin is inserted into one of the fourth plurality of holes to thereby supporting the cutting board device by both the first wall device and the second wall device in a manner such that the cutting board is positioned substantially parallel to the base.

2. The method of claim 1 further comprising removing the cutting board device so that the cutting board device is no longer suspended and supported above the base;

placing a second item on the base;

inserting a knife so that a first part of the knife is in a vertical slot of a plurality of vertical slots of a first wall device, a second part of the knife is in between the first wall device and a second wall device and above the base, and a third part of the knife is in a corresponding vertical slot of a plurality of vertical slots of a second wall device; and using the knife to cut the second item by cutting through second item until the knife contacts the base.

3. The method of claim 1 wherein the first wall device is configured to be attached to the base by inserting the first wall device into a first slot of the base;

wherein the second wall device is configured to be attached to the base by inserting the second wall device into a second slot of the base; and wherein the first slot and the second slots of the base are substantially parallel.

4. The method of claim 1 wherein the base has first, second, third, and fourth slots, which are parallel to each other and spaced apart from each other;

wherein the first wall device is configured to be attached to the base by inserting the first wall device into the first slot or the second slot of the base; and wherein the second wall device is configured to be attached to the base by inserting the second wall device into the third slot or the fourth slot of the base.

5. The method of claim 4 further comprising attaching a front plate to a third slot of the base by inserting the front plate into the third slot of the base; and attaching a rear plate to a fourth slot of the base by inserting the rear plate into the fourth slot of the base;

wherein the first slot and the second slots of the base are substantially perpendicular to the third and fourth slots of the base; and and wherein the base, the first wall device, the second wall device, the front plate, and the cutting board body are configured to together enclose an inner chamber, except for the top which may be open, into which an item can be placed so that the item rests on the base.

6. The method of claim 5 further comprising placing a top member so that top edges of the first and second wall devices are inserted into first and second slots of the top member, and top edges of the front and rear plates are inserted into the third and fourth slots, to attach the top member to the first and second wall devices, and the front and rear plates to further enclose the inner chamber by the base, top member, the first and second wall devices, and the front and rear plates.

7. The method of claim 1 wherein wherein any particular plate of a plurality of plates is configured to be inserted into any one of the plurality of vertical slots of the first wall device and thereafter into a corresponding slot of the plurality of vertical slots of the second wall device, such that a first part of the particular plate sits in one of the plurality of vertical slots of the first wall device, a second part of the particular plate sits between the first wall device and the second wall device, and a third part of the particular plate sits in a corresponding one of the plurality of vertical slots of the second wall device.

8. The method of claim 7 wherein the cutting board body has a top surface which includes a plurality of grooves which are parallel to each other; and wherein when the particular plate is between the first wall device and the second wall device the second part of the particular plate is configured to sit in one of the plurality of grooves.

9. An apparatus comprising:

a first wall device;

a second wall device;

a cutting board device; and a base;

wherein the first wall device has a plurality of vertical slots which are parallel to each other and spaced apart from each other;

wherein the second wall device has a plurality of vertical slots which are parallel to each other and spaced apart from each other;

wherein the first wall device is configured to be attached to the base in a manner such that the first wall device projects out from the base, and is at an angle with respect to the base;

wherein the second wall device is configured to be attached to the base in a manner such that the second wall device projects out from the base, and is at angle with respect to the base;

wherein the first wall device has a top and a bottom edge;

wherein the second wall device has a top and a bottom edge;

wherein the top and bottom edges of the first and second wall devices are configured to be parallel to each other when the first and second wall devices are attached to the base;

wherein each slot of the plurality of vertical slots of the first wall device has a corresponding slot of the plurality of vertical slots of the second wall device;

wherein each slot of the plurality of vertical slots of the first wall device has a first end and an opposing second end, wherein each first end of each slot of the plurality of vertical slots of the first wall device is closer to the base than its corresponding second end of each slot of the plurality of vertical slots of the first wall device, when the first wall device and the second wall device are attached to the base;

wherein each slot of the plurality of vertical slots of the second wall device has a first end and an opposing second end, wherein each first end of each slot of the plurality of vertical slots of the second wall device is closer to the base than its corresponding second end of the plurality of vertical slots of the second wall device, when the first wall device and the second wall device are attached to the base;

wherein each first end of each slot of the plurality of vertical slots of the first wall device is spaced apart by a lower chamber width, from each first end of its corresponding slot of the plurality of vertical slots of the second wall device, when the first and second wall devices are attached to the base;

wherein a front plane of the base is the approximately same distance away from the first end of each slot of the plurality of vertical slots of the first wall device as from each first end of its corresponding slot of the plurality of vertical slots of the second wall device, when the first and second wall devices are attached to the base; and wherein the cutting board device includes a cutting board body and a means for removably supporting the cutting board device by both the first wall device and the second wall device so that a first part of the cutting board device rests on the first wall device and a second part of the cutting board device rests on the second wall device to thereby support and suspend the cutting board body above and substantially parallel to the base, so that the cutting board body does not contact the base P1 wherein the means allows the cutting board body to be supported and suspended above and substantially parallel to the base at different heights above the base, wherein the means includes first, second, third, and fourth pins which are fixed to and project out from the cutting board body and wherein the first wall device includes first and second plurality of holes and the second wall device includes third and fourth plurality of holes, and wherein the first pin is inserted into one of the first plurality of holes, the second pin is inserted into one of the second plurality of holes, the third pin is inserted into one of the third plurality of holes, and the fourth pin is inserted into one of the fourth plurality of holes to thereby supporting the cutting board device by both the first wall device and the second wall device in a manner such that the cutting board is positioned substantially parallel to the base.

10. The apparatus of claim 9 wherein
the base is also a cutting board, and the cutting board device is configured to be removed from the apparatus and the base connected to the first wall device and the second wall device with the first wall device and the second wall device separated from each other.

11. The apparatus of claim 9 wherein
the first wall device is configured to be attached to the base by inserting the first wall device into a first slot of the base;
wherein the second wall device is configured to be attached to the base by inserting the second wall device into a second slot of the base; and
wherein the first slot and the second slots of the base are substantially parallel.

12. The apparatus of claim 11 further comprising
a front plate; and
a rear plate;
wherein the front plate is configured to be attached to a third slot of the base by inserting the front plate into the third slot of the base;
wherein the rear plate is configured to be attached to a fourth slot of the base by inserting the rear plate into the fourth slot of the base;
wherein the first slot and the second slots of the base are substantially perpendicular to the third and fourth slots of the base;

and wherein the base, the first wall device, the second wall device, the front plate, and the cutting board body are configured to together enclose an inner chamber, except for the top which may be open, into which an item can be placed so that the item rests on the base;
and wherein the apparatus is configured to allow the item to be cut by inserting a knife through one of the plurality of vertical slots of the first wall device and a corresponding one of the plurality of vertical slots of the second wall device.

13. The apparatus of claim 12 further comprising
a top member;
wherein the top member has first, second, third, and fourth slots;
and wherein the top member is configured to be placed so that top edges of the first and second wall devices are inserted into the first and second slots of the top member, and top edges of the front and rear plates are inserted into the third and fourth slots, to attach the top member to the first and second wall devices, and the front and rear plates to further enclose the inner chamber by the base, top member, the first and second wall devices, and the front and rear plates.

14. The apparatus of claim 9 wherein
the base has first, second, third, and fourth slots, which are parallel to each other and spaced apart from each other;
wherein the first wall device is configured to be attached to the base by inserting the first wall device into the first slot or the second slot of the base; and
wherein the second wall device is configured to be attached to the base by inserting the second wall device into the third slot or the fourth slot of the base.

15. The apparatus of claim 9 further comprising
a plurality of plates; and
wherein any particular plate of the plurality of plates is configured to be inserted into any one of the plurality of vertical slots of the first wall device and thereafter into a corresponding slot of the plurality of vertical slots of the second wall device, such that a first part of the particular plate sits in one of the plurality of vertical slots of the first wall device, a second part of the particular plate sits between the first wall device and the second wall device, and a third part of the particular plate sits in a corresponding one of the plurality of vertical slots of the second wall device.

16. The apparatus of claim 15 wherein
the cutting board body has a top surface which includes a plurality of grooves which are parallel to each other; and
wherein when the particular plate is between the first wall device and the second wall device the second part of the particular plate is configured to sit in one of the plurality of grooves.

* * * * *